(12) United States Patent
Sone et al.

(10) Patent No.: US 6,386,983 B1
(45) Date of Patent: *May 14, 2002

(54) CONSTANT VELOCITY JOINT HAVING EIGHT TORQUE TRANSMITTING BALLS

(75) Inventors: Keisuke Sone, Hamamatsu; Kazuhiko Hozumi, Fukuroi; Yoshihisa Kaneko, Morimachi; Tatsuro Sugiyama, Iwata, all of (JP)

(73) Assignee: NTN Corporation, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/500,532

(22) Filed: Feb. 9, 2000

(30) Foreign Application Priority Data

Dec. 26, 1995 (JP) ............................................ 7-339345
Dec. 28, 1995 (JP) ............................................ 7-343519
Apr. 26, 1996 (JP) ............................................ 8-107316

(51) Int. Cl.⁷ ............................................ F16D 3/224
(52) U.S. Cl. ............................................ 464/145
(58) Field of Search .............................. 464/141, 143, 464/145, 906

(56) References Cited

U.S. PATENT DOCUMENTS

| | | |
|---|---|---|
| 1,916,442 A | 7/1933 | Rzeppa |
| 1,975,758 A | 10/1934 | Stuber |
| 2,838,919 A | 6/1958 | Cull |
| 3,298,201 A | 1/1967 | Cadiou |
| 3,412,580 A | 11/1968 | Cull |
| 4,090,375 A * | 5/1978 | Takahashi et al. ...... 464/906 X |
| 4,473,129 A * | 9/1984 | Guimbretiere .......... 464/145 X |
| 5,221,233 A | 6/1993 | Jacob |
| 5,453,052 A | 9/1995 | Harz et al. |
| 5,542,885 A | 8/1996 | Krude et al. |
| 5,609,527 A | 3/1997 | Fuerstenau et al. |
| 5,616,081 A | 4/1997 | Krude et al. |
| 5,624,318 A | 4/1997 | Jacob et al. |
| 5,647,801 A | 7/1997 | Jacob |
| 5,685,777 A | 11/1997 | Schwarler |
| 5,692,960 A | 12/1997 | Sugiyama et al. |
| 5,853,328 A * | 12/1998 | Kobayashi et al. ......... 464/145 |
| 6,267,682 B1 * | 7/2001 | Sone et al. ................. 464/140 |

FOREIGN PATENT DOCUMENTS

| | | |
|---|---|---|
| DE | 97926 | 5/1973 |
| EP | 892 187 A2 | 1/1999 |
| FR | 2512141 | 8/1982 |
| JP | 61-58684 | 12/1986 |
| JP | 2-23731 | 5/1990 |
| JP | 3-292419 | 12/1991 |
| JP | 4-307117 | 10/1992 |
| JP | 6-25708 | 7/1994 |
| JP | 8-210374 | 8/1996 |
| JP | 2582028 | 11/1996 |

* cited by examiner

Primary Examiner—Lynne H. Browne
Assistant Examiner—Greg Binda
(74) Attorney, Agent, or Firm—Arent Fox Kintner Plotkin & Kahn PLLC

(57) ABSTRACT

A constant velocity joint includes an outer joint member having eight axially extending curved guide grooves formed in a spherical inner surface. Likewise, an inner joint member has eight axially extending curved guide grooves formed in a spherical outer surface. Eight ball tracks are defined between the guide grooves of the inner and outer joint members. Each ball track is enlarged in wedge form in a sense of the axial direction. A torque transmitting ball is disposed in each ball track and a cage is provided having a corresponding number of pockets for storing the torque transmitting balls. A bearing is provided having a fixing member, first and second outer races, first and second inner races, and rolling members between the first and second outer races and the first and second inner races. The first and second outer races are provided in the fixing member while the first and second inner races are provided on the outer joint member.

4 Claims, 20 Drawing Sheets

POSITION OF BALLS IN POCKETS OF CAGE
AT INCORPORATION ANGLE α
(IN A CASE WITHOUT CAGE OFFSET)

POSITION OF BALLS IN POCKETS OF CAGE
AT INCORPORATION ANGLE α
(IN A CASE WITH CAGE OFFSET)

$O_1$: CENTER OF GUIDE GROOVE OF OUTER JOINT MEMBER
$O_1'$: SPHERICAL CENTER OF INNER DIAMETER SURFACE OF OUTER JOINT MEMBER
$O_2$: CENTER OF GUIDE GROOVE OF INNER JOINT MEMBER
$O_2'$: SPHERICAL CENTER OF OUTER DIAMETER SURFACE OF INNER JOINT MEMBER
$O_3$: CENTER OF TORQUE TRANSMITTING BALL AT OPERATING ANGLE 0°

FIG.24A  TABLE 1

| r1 | 3.2 | 3.3 | 3.4 | 3.5 | 3.6 | 3.7 | 3.8 | 3.9 |
|---|---|---|---|---|---|---|---|---|
| DURABILITY | ○ | ○ | ○ | ○ | ○ | ○ | ○ | ○ |
| STRENGTH OF OUTER JOINT MEMBER | × | △ | △ | ○ | ○ | ○ | ○ | ○ |
| STRENGTH OF INNER JOINT MEMBER | × | △ | △ | ○ | ○ | ○ | ○ | ○ |
| STRENGTH OF CAGE | × | △ | △ | ○ | ○ | ○ | ○ | ○ |

○ :GOOD   △ :RATHER GOOD   × :BAD   (EIGHT BALLS)

FIG.24B  TABLE 2

| r1(=PCDBALL/DBALL) | | r2(=DOUTER/PCDSERR) | |
|---|---|---|---|
| EMBODIMENT ARTICLE (EIGHT BALLS) | COMPARATIVE ARTICLE (SIX BALLS) | EMBODIMENT ARTICLE (EIGHT BALLS) | COMPARATIVE ARTICLE (SIX BALLS) |
| $3.3 \leq r1 \leq 5.0$ | $3.0 \leq r1 \leq 3.5$ | $2.5 \leq r2 \leq 3.5$ | $3.2 \leq r2$ |

FIG.24C  TABLE 3

| | | THE STATE AFTER PASSAGE OF 300 HOURS | | | |
|---|---|---|---|---|---|
| | | OUTER JOINT MEMBER | INNER JOINT MEMBER | CAGE | BALL |
| EMBODIMENT ARTICLE (EIGHT BALLS) | NO1 | ○ | ○ | ○ | ○ |
| | NO2 | ○ | ○ | ○ | ○ |
| COMPARATIVE ARTICLE (SIX BALLS) | NO3 | ○ | ○ | ○ | ○ |
| | NO4 | ○ | ○ | ○ | ○ |

○ :NO DAMAGE

CONSTANT VELOCITY JOINT HAVING EIGHT TORQUE TRANSMITTING BALLS

This application is a divisional application of U.S. patent application Ser. No. 08/860,719, filed Jul. 14, 1997, now U.S. Pat. No. 6,120,382 which was the National Stage of International Application No.: PCT/JP96/03702 filed Dec. 19, 1996 now abandoned.

The present invention relates to a constant velocity joint having 8 torque transmitting balls.

Constant velocity joints are classified roughly into the fixed type allowing only angular displacement between two axes and the plunging type allowing angular displacement and axial displacement between two axes. One of the features of the fixed type constant velocity joint, as compared with the plunging type, is that it is capable of taking a high operating angle. For example, the fixed type constant velocity joint used in the drive shaft of an automobile is required to have a maximum operating angle of, e.g., 45° or more; however, such high operating angle can be provided only by the fixed type. On the other hand, the fixed type constant velocity joint, as compared with the plunging type, inevitably has its internal construction somewhat complicated.

FIGS. 23A and 23B show a Rzeppa type constant velocity joint typical of the fixed type constant velocity joint. This constant velocity joint comprises an outer joint member 11 having a spherical inner surface 11*a* axially formed with 6 curved guide grooves 11*b*, an inner joint member 12 having a spherical outer surface 12*a* axially formed with 6 curved guide grooves 12*b* and an inner surface formed with serrations (or splines) 12*c* for connection to a shaft, 6 torque transmitting balls 13 disposed in ball tracks defined between the guide grooves 11*b* and 12*b* of the outer and inner joint members 11 and 12, respectively, and a cage 14 for retaining the torque transmitting balls 13.

The centers A and B of the guide grooves 11*b* and 12*b* of the outer and inner joint members 11 and 12, respectively, are offset with respect to the spherical centers of the inner and outer surfaces 11*a* and 12*a*, respectively, by an equal distance in opposite directions (the guide groove center A is offset toward the open side of the joint, and the guide groove center B toward the innermost side of the joint). As a result, the ball track defined between the guide groove 11*b* and the guide groove 12*b* corresponding thereto is wedge-wise enlarged toward the open side of the joint. The spherical centers of the inner and outer surfaces 11*a* and 12*a* of the outer and inner joint members 11 and 12 are located in the joint center plane O including the centers of the torque transmitting balls 13.

When the outer and inner joint members 11 and 12 make an angular displacement of angle θ, the torque transmitting balls 13 guided by the cage 14 are maintained in the bisector plane (θ/2) bisecting the angle θ irrespective of the value of the operating angle θ, and hence uniform velocity is secured.

SUMMARY OF THE INVENTION

An object of the present invention is to make this type of constant velocity joint more compact and secure the strength, load capacity and durability which are at least equal to those in a comparative article (such as a 6-ball constant velocity joint as shown in FIG. 23).

To achieve the above object, the invention provides a constant velocity ball joint comprising an outer joint member having a plurality of axially extending curved guide grooves formed in the spherical inner surface thereof, an inner joint member having a plurality of axially extending curved guide grooves formed in the spherical outer surface thereof, a plurality of ball tracks defined between the guide grooves of the outer joint member and the guide grooves of the inner joint member corresponding thereto, said ball tracks being enlarged in one sense of the axial direction, a torque transmitting ball disposed in each of the plurality of ball tracks, a cage having a plurality of pockets for storing the torque transmitting balls, said constant velocity joint being characterized in that the number of said ball tracks and the number of said torque transmitting balls disposed are eight.

The ratio r1 ($=PCD_{BALL}/D_{BALL}$) of the pitch circle diameter ($PCD_{BALL}$) of the torque transmitting balls to the diameter ($D_{BALL}$) of said torque transmitting balls may be within the range $3.3 \leq r1 \leq 5.0$. The pitch circle diameter ($PCD_{BALL}$) of the torque transmitting balls is twice the length of a line segment connecting the centers of the guide grooves of the outer or inner joint member and the centers of the torque transmitting balls (the length of a line segment connecting the centers of the guide grooves of the outer joint member and the centers of the torque transmitting balls and the length of a line segment connecting the centers of the guide grooves of the inner joint member and the centers of the torque transmitting balls are equal), whereby the nature of constant velocity of the joint is secured, said length being hereinafter referred to as (PCR)); thus, $PCD_{BALL}=2 \times PCR$.

The reason for selection of $3.3 \leq r1 \leq 5.0$ is that the strength of the outer joint member, the joint load capacity and durability should be made at least as high as in a comparative article (6-ball constant velocity joint). That is, in constant velocity joint, it is very hard to drastically change the diameter ($PCD_{BALL}$) of said torque transmitting balls in the limited space. Thus, the value of r1 depends mainly on the diameter $D_{BALL}$ of said torque transmitting balls.

If $r1<3.3$ (mainly when the diameter $D_{BALL}$ is large), the thickness of the other parts (the outer joint member, inner joint member, etc.) would be too small, causing anxiety about the strength. On the contrary, if $r1>5.0$ (mainly when the diameter $D_{BALL}$ is small), the load capacity would be too small, causing anxiety about the durability. Also caused is the anxiety that the surface pressure on the surface of contact between the torque transmitting balls and the guide grooves would increase (because the contact oval area decreases with decreasing diameter $D_{BALL}$), forming a main cause of the chipping of the edges of the guide grooves.

The range $3.3 \leq r1 \leq 5.0$ provides greater degrees of strength of the outer joint member, of load capacity and durability of the joint than in the comparative article (6-ball constant velocity joint. This is proved to some extent by tests.

As shown in Table 1 (FIG. 24A) (which shows the estimation of the results of comparative tests), when r1=3.2, sufficient strength for the outer and inner joint members and cage was not obtained, an undesirable result. When r1=3.3, or 3.4, a rather good result was obtained in respect of strength. Particularly, when $r1 \geq 3.5$, sufficient strength for the outer and inner joint members and cage was obtained, a desirable result. In addition, for the range r1>3.9, though no test has been conducted, it is expected that as good a result as the above will be obtained. If r1>5.0, however, it is considered that problems will arise in respect of durability and the outer and inner joints, as described above; thus, it is desirable that $r1 \leq 5.0$.

From the above, it is desirable that r1 be in the range $3.3 \leq r1 \leq 5.0$, preferably $3.5 \leq r1 \leq 5.0$.

Further, in addition to the above arrangement, it is desirable that the ratio r2 ($=D_{OUTER}/PCD_{SERR}$) of the outer diameter ($D_{OUTER}$) of the outer joint member to the pitch circle diameter ($PCD_{SERR}$) of the tooth profile formed in the inner surface of said inner joint member 2 be within the range $2.5 \leq r2 \leq 3.5$.

The reason for selection of $2.5 \leq r2 \leq 3.5$ is as follows: The pitch circle diameter ($PCD_{SERR}$) cannot be widely changed because of the relation to the strength of the mating shaft. Therefore, the value of r2 depends of the outer diameter ($D_{OUTER}$) of the outer joint member. If r2<2.5 (occurring mainly when the outer diameter $D_{OUTER}$ is small), the wall thickness of the each part (outer and inner joint members, etc.,) would be too thin, causing anxiety in respect of strength. On the other hand, if r2>3.5 (occurring mainly when the outer diameter $D_{OUTER}$ is large), a problem would sometimes arise from a dimensional aspect and the object of making the joint compact could not be attained. The range $2.5 \leq r2 \leq 3.5$ provides a greater degree of strength of the outer joint member, of durability of the joint than in the comparative article (6-ball constant velocity joint), and provides contentment in practical use. Particularly, setting $2.5 \leq r2 < 3.2$ provides the merit of enabling the outer diameter to be reduced as compared with the comparative article (6-ball constant velocity joint of the same nominal size: usually, $r2 \geq 3.2$).

Thus, r2 should be in the range $2.5 \leq r2 \leq 3.5$, preferably $2.5 \leq r2 < 3.2$.

The ball tracks which are enlarged in wedge form in one sense of the axial direction are obtained by offsetting the the centers of the guide grooves of the inner and outer joint members, respectively, with respect to the spherical centers of the outer and inner surfaces thereof axially by an equal distance (F) in opposite directions. It is desirable that the ratio R1 (=F/PCR) of the offset (F) to PCR described above be set within the range $0.069 \leq R1 \leq 0.121$.

The reason for selection of $0.069 \leq R1 \leq 0.121$ is as follows: When considered with PCR fixed, generally, during application of an operating angle, the greater the offset (F), the lower the track load (which is the load applied to the area of contact between the guide grooves and the torque transmitting balls; therefore, in respect of load, it may be said that larger offset (F) is more advantageous.

If, however, the offset (F) is too large:
(i) torque is reduced in the high operating angle zone, incurring the decrease of allowable load torque;
(ii) in the pockets of the cage, the amount of radial movement of the torque transmitting balls increases, so that to prevent the torque transmitting balls from falling off, it is necessary to increase the wall thickness (radial dimension) of the cage; and
(iii) in the pockets of the cage, the amount of circumferential movement of the torque transmitting balls increases, so that to secure the proper movement of the torque transmitting balls from falling off, it is necessary to increase the circumferential dimension of the cage. Therefore, the posts of the cage become thinner, raising a problem in respect of strength.

On the other hand, if the offset (F) is too small:
(iv) during application of an operating angle, the peak values of the track load (P1) on the load side, and the track load on the non-load side (P2: during 1 revolution, a phase appears in which the non-load side track is loaded) increase, (P1 and P2 indicate peak values at a predetermined phase angle), incurring decreased durability; and
(v) the maximum operating angle decreases.

Thus, too large and too small amounts of offset (F) are both undesirable, and there should be an optimum range in which said problems of (i), (ii), (iii) are balanced with said problems of (iv), (v). However, the optimum range of offset (F) varies with the size of the joint and hence must be determined in relation to the basic size of the joint. This accounts for the use of ratio R1 (=F/PCR). If R1>0.121, said problems of (i), (ii), (iii) come up and so does said problems of (iv) and (v) if R1<0.069. From the viewpoint of securing the allowable load torque, securing the cage strength, reducing the track load, securing the durability, and securing the maximum operating angle, the optimum range for the offset (F) is $0.069 \leq R1 \leq 0.121$. The upper limit (0.121) of the R1 is considerably smaller than the ordinary value of R1 (which is generally 0.14) in the comparative article (6-ball constant velocity joint). It may be said that in respect of the improvement of allowable torque and the cage strength, the present article is given consideration the more for the less R1 as compared with the comparative article. The success of setting the R1 within said range is due to the facts that the present article is provided with 8 torque transmitting balls, which is more advantageous in respect of track load than the comparative article (this is verified by theoretical analysis) and that the temperature rise is relatively low, as compared with the comparative article (this is verified by experiments, see FIGS. 11. and 12). In the comparative article (6-ball constant velocity joint, if R1 is set within said range, the track load would become too high, leading to the decrease of durability.

In addition to the above arrangement, the spherical centers of the outer and inner surfaces of the cage may be offset with respect to the joint center plane including the centers of the torque transmitting balls, axially by the same distance (f) in opposite directions. In this case, it is recommendable that the ratio R2 (=f/PCR) of the offset (f) to PCR be within the range $0 < R2 \leq 0.052$.

The reason for selection of $0 < R2 \leq 0.052$ is as follows: Generally, the provision of the offset (f) increases the area of the inner surface of the cage, and the resulting decrease of heat generation improves the durability, and allows the increase of the wall thickness of the inlet of the cage incorporating the inner joint member, thus providing the merit of increasing the strength.

However, if the offset (f) is too large,
(i) the amount of circumferential movement of the torque transmitting balls in the pockets of the cage increases, so that in order to secure the proper movement of the torque transmitting balls, the necessity arise of increasing the circumferential dimension of the cage. Therefore, the posts of the cage become thinner, causing a problem in respect of strength; and
(ii) the wall thickness of the portion of the cage opposite to the inlet becomes thinner, causing a problem in respect of strength.

From the above, it is seen that too large offset (t) is not desirable and that there is an optimum range in which the significance of providing offset (f) can be balanced with the problems of (i) and (ii). However, since the optimum range of offset (f) varies with the size of the joint, it should be found in relation to the basic size which indicates the joint size. This accounts for the sue of the ratio R2 (=f/PCR). If R1>0.052, said problems of (i) and (ii) come up. From the viewpoint of the securing of the cage strength and durability, the optimum range of offset (f) is $0 < R2 \leq 0.052$.

BRIEF DESCRIPTION OF THE DRAWINGS

FIGS. 24A–C provide Tables 1–3, which present comparative test results.

DESCRIPTION OF THE PREFERRED EMBODIMENTS

Embodiments of the invention will now be described with reference to the drawings.

Figure 1A:
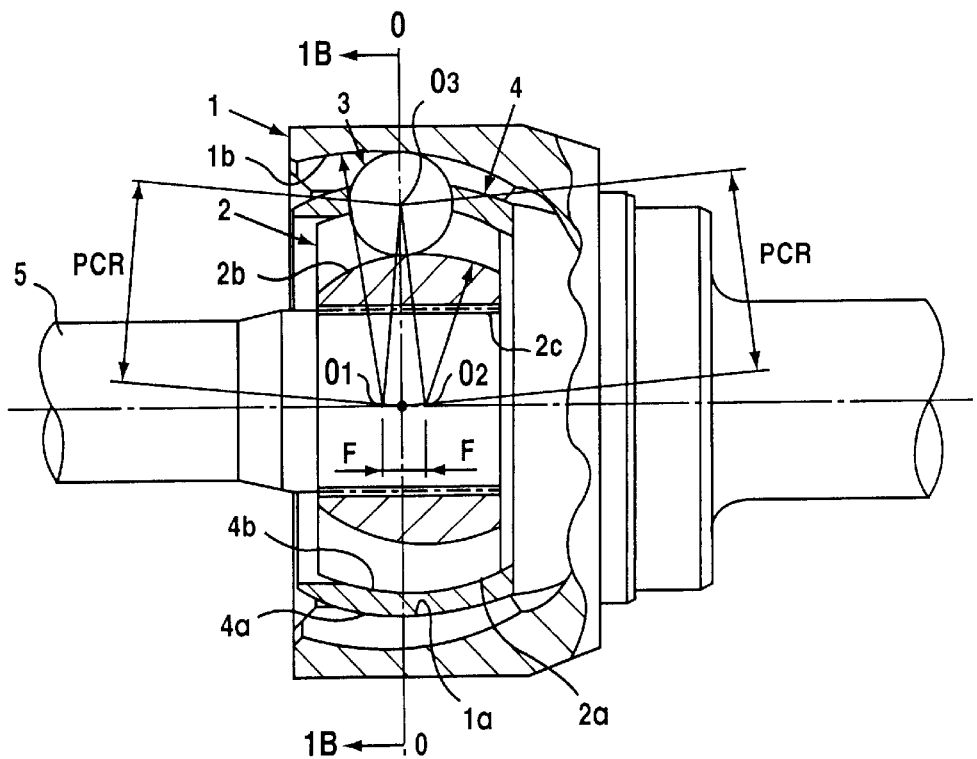
FIG. 1A is a longitudinal section showing a constant velocity joint according to a first embodiment of the invention.
Figure 1B:
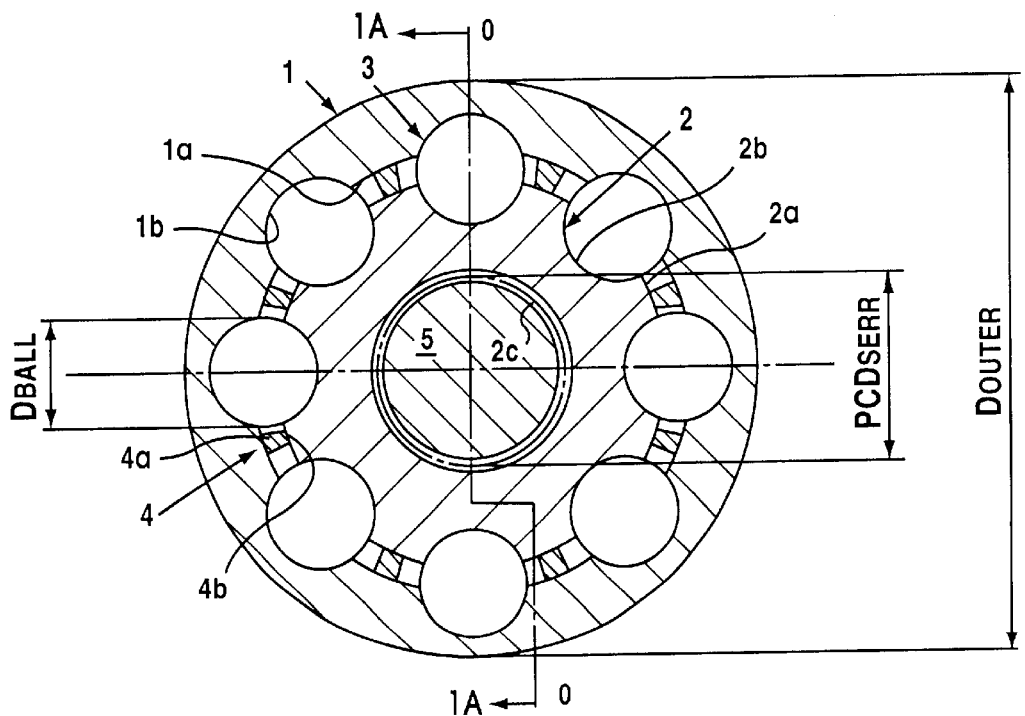
FIG. 1B is a cross section thereof.

As shown in FIGS. 1A and 1B, a constant velocity joint in this embodiment comprises an outer joint member 1 having 8 curved guide grooves 1b axially formed in the spherical inner surface 1a thereof, an inner joint member 2 having 8 curved guide grooves 2b axially formed in the spherical outer surface 2a thereof and serrations (or splines) 2c formed on the inner surface for connection to a shaft portion 5, 8 torque transmitting balls 3 disposed in ball tracks defined between the guide grooves 1b and 2b of the outer and inner joint members 1 and 2, and a cage 4 for retaining the torque transmitting balls 3.

In this embodiment, the centers O1 and O2 of the guide grooves 1b and 2b of the outer and inner joint members 1 and 2, respectively, are offset with respect to the spherical centers of the inner and outer surfaces 1a and 2a axially by an equal distance F in opposite directions (the center O1 is offset toward the open side of the joint, and the center O2 toward the innermost side of the joint). As a result, the ball track defined between the guide groove 1b and the guide groove 2b corresponding there o is wedge-wise enlarged toward the open side of the joint.

The spherical center of the outer surface 4a of the cage 4 and the spherical center of the inner surface 1a of the outer joint member 1 which serves as a guide surface for the outer surface 4a of the cage 4 are located in the joint center plane O including the centers of the torque transmitting balls 3. Further, the spherical center of the inner surface 4b of the cage 4 and the spherical center of the outer surface 2a of the inner joint member 2 which serves as a guide surface for the inner surface 4b of the cage 4 are located in the joint center plane O. Therefore, in this arrangement, the amount (F) of offset of the outer joint member 1 is equal to the axial distance between the center O1 of the guide grooves 1b and the joint center plane O, while the amount (F) of offset of the inner joint member 2 is equal to the axial distance between the center O2 of the guide grooves 2b and the joint center plane O; thus, the two are equal. The center O1 of the guide grooves 1b of the outer joint member 1 and the center O2 of the guide grooves 2b of the inner joint member 2 are axially shifted with respect to the joint center plane O through the same distance (F) in opposite directions (the center O1 of the guide grooves 1b are shifted toward the open side of the joint and the center O2 toward the innermost side of the joint). The length of a line segment connecting the center O1 of the guide grooves 1b of the outer joint member 1 and the centers O3 of the torque transmitting balls 3, and the length of a line segment connecting the center O2 of the guide grooves 2b of the inner joint member 2 and the centers O3 of the torque transmitting balls 3 are each equal to PCR; thus, the two are equal.

When the outer and inner joint members 1 and 2 make an angular displacement by an angle θ, the torque transmitting balls 3 guided by the cage 4 are maintained in a bisector plane (θ/2) bisecting the angle θ, at any operating angle θ, so that the uniformity of velocity for the joint is secured.

In this embodiment, in addition to the above arrangement, the main dimensions of the joint are set at the following values.

① The ratio r1 (=$PCD_{BALL}/D_{BALL}$) of the pitch circle diameter $PCD_{BALL}$ ($PCD_{BALL}=2\times PCR$) of the torque transmitting balls 3 to their diameter $D_{BALL}$ is within the range $3.3 \leq r1 \leq 5.0$, preferably $3.5 \leq r1 \leq 5.0$ (or $3.5 < r1 \leq 5.0$), which setting is preferable from the viewpoint of securing the strength, load capacity and durability of the outer joint member, etc. In this embodiment, however, r1 is set such that r1=3.83. Further, ② the ratio r2 (=$D_{OUTER}/PCD_{SERR}$) of the outer diameter $D_{OUTER}$ of the outer joint member 1 to the pitch circle diameter $PCD_{SERR}$ of the serrations (or splines) 2c of the inner joint member 2 is set within the range $2.5 \leq r2 \leq 3.5$, for example, $2.5 \leq r2 < 3.2$. In addition, the arrangement ① may be singly used.

Figure 23A:
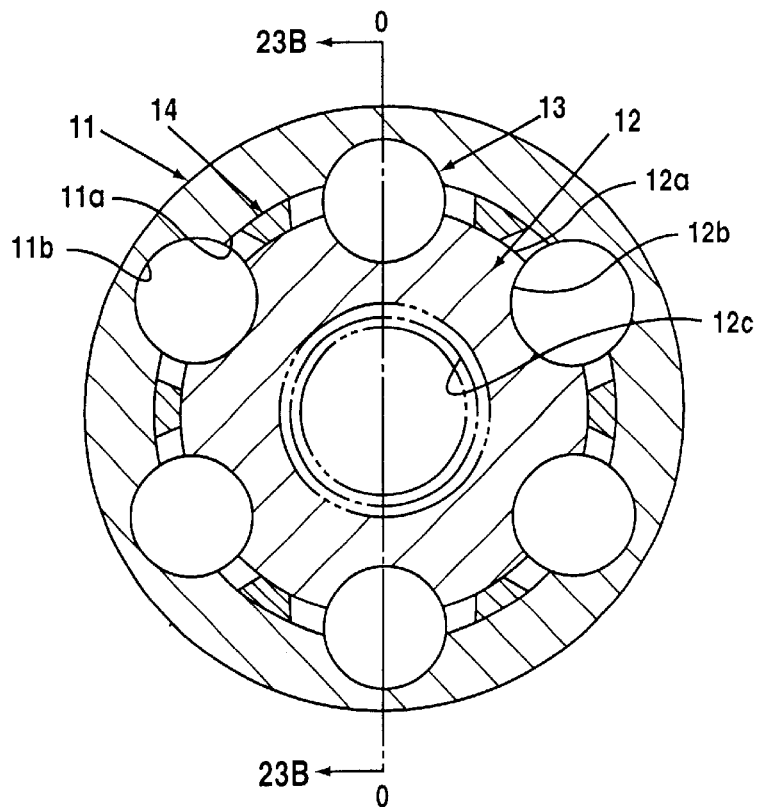
FIG. 23A shows an example of a fixed type constant velocity joint having 6 torque transmitting balls.
Figure 23B:
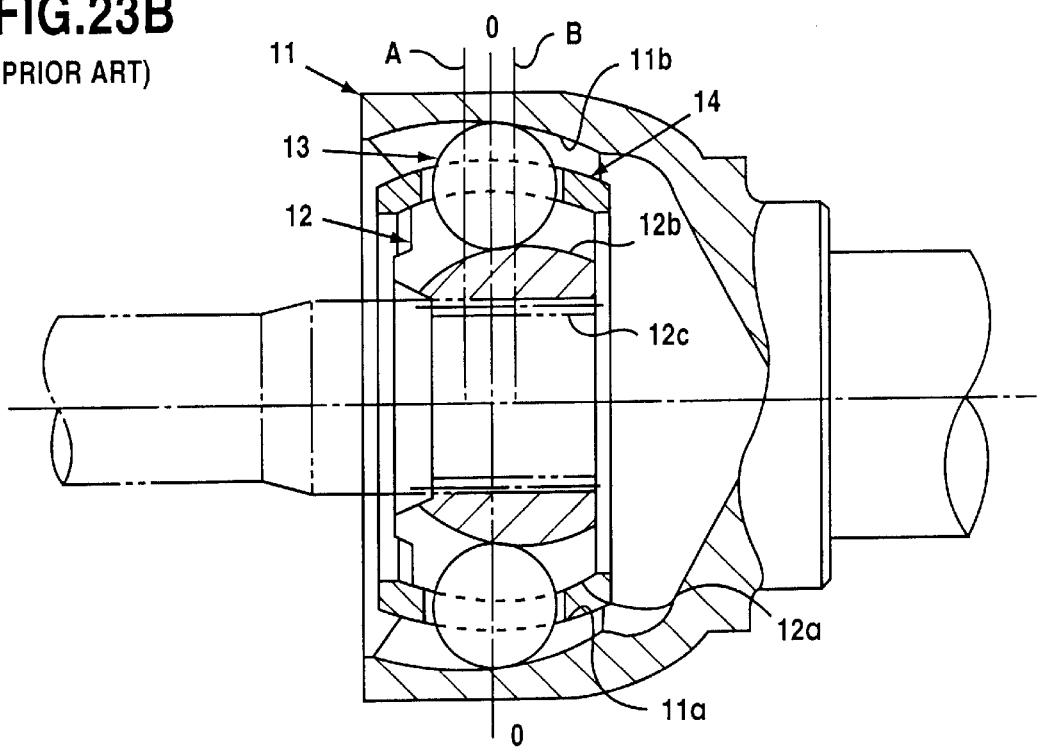
FIG. 23B is a cross section thereof.

Joints of arrangements ① and ② were compared with comparative articles (6-ball constant velocity joints such as one shown in FIG. 23) of the same nominal size as that of said joints, and the results are shown in Table 2 (FIG. 24B).

The constant velocity joint in this embodiment has 8 torque transmitting balls 3 and the ratio of the total load on the joint to the load supported by one torque transmitting ball is small (as compared with the 6-ball constant velocity joint), thus making it possible to reduce the diameter $D_{BALL}$ of the torque transmitting balls 3 as compared with the comparative article of the same nominal size (6-ball constant velocity joint) and to make the respective thicknesses of the outer and inner joint members 1 and 2 substantially equal to those of the comparative article (6-ball constant velocity joint).

Further, as compared with the comparative article of the same nominal size (6-ball constant velocity joint), the present joint can be made compact and at the same time the ratio r2 (=$D_{OUTER}/PCD_{SERR}$) can be reduced ($2.5 \leq r2 < 3.2$) and the strength, load capacity and durability which are at least equal to those of the comparative article (6-ball constant velocity joint).

It is recommendable to set the amount of offset of the guide grooves 1b and 2b as follows. As described above, ③ it is desirable that the ratio R1 (=F/PCR) be set within the range $0.069 \leq R1 \leq 0.121$ from the viewpoint of securing the allowable load torque, securing the cage strength, reducing the track load, securing the durability, and securing the maximum operating angle. However, in this embodiment, R1=0.104 (or 0.1038). The ordinary value of R1 for the comparative article (6-ball constant velocity joint) is 0.14. The R1 of this embodiment is considerably smaller than that of the comparative article.

Figure 2A:
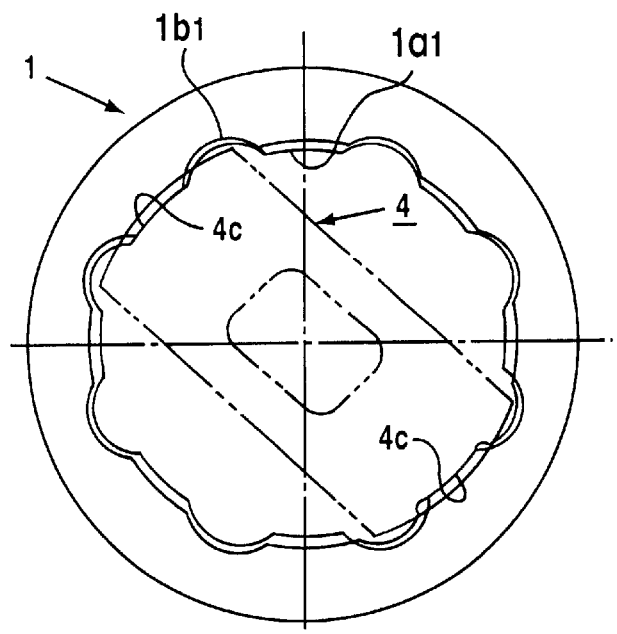
FIG. 2A is a front view of an outer ring.
Figure 2B:
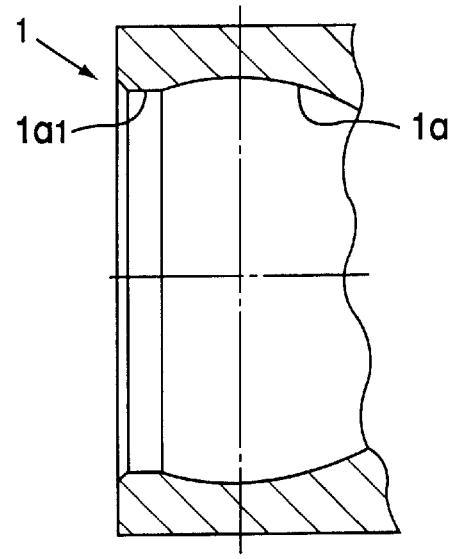
FIG. 2B is a partial longitudinal section.

FIGS. 2A through 2D show the outer joint member. A region in the open side of the inner surface 1a of the outer joint member 1 is formed with a cylindrical cut 1a1 for incorporating the cage 4 into the inner surface 1a. In incorporation of the cage 4, with the axes positioned to intersect at right angles with each other, as shown in FIG. 2A, the pockets 4c of the cage 4 (which is an assembly having the inner joint member 2 incorporated into the inner surface 4b of the cage 4) are brought into the cylindrical cut 1a1. In this manner, the cage 4 is inserted until the spherical center of the outer surface 4a coincides with the spherical center of the inner surface 1a of the outer joint member 1. From this state, the cage 4 is turned through 90 degrees until the axis of the cage 4 coincides with the axis of the outer joint member 1. Thereby, the cage 4 (together with the inner joint member 2) is completely incorporated into the inner surface 1a of the inner outer joint member 1.

Figure 2C:
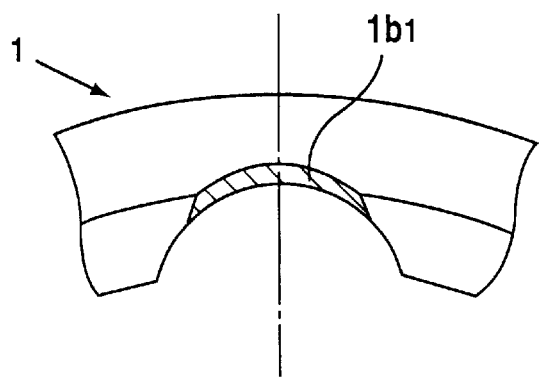
FIG. 2C is an enlarged front view of a guide groove.
Figure 2D:
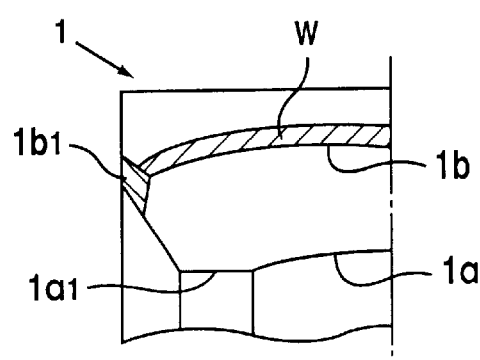
FIG. 2D is an enlarged longitudinal section of the end of the outer ring.

Further, as shown enlarged in FIGS. 2C and 2D, a region associated with the guide grooves 1b of the outer joint member 1 is formed with a chamfer 1b1. The chamfer 1b1 has a function which, when the guide grooves 1b are heat-treated (in the region W in FIG. 2D), prevents the hardening-through (i.e., prevents the open end surface of the outer joint member 1 from being hardened) and at the same time the chamfer can be utilized as a guide when the torque transmitting balls 3 are incorporated into the pockets 4c.

Figure 3A:
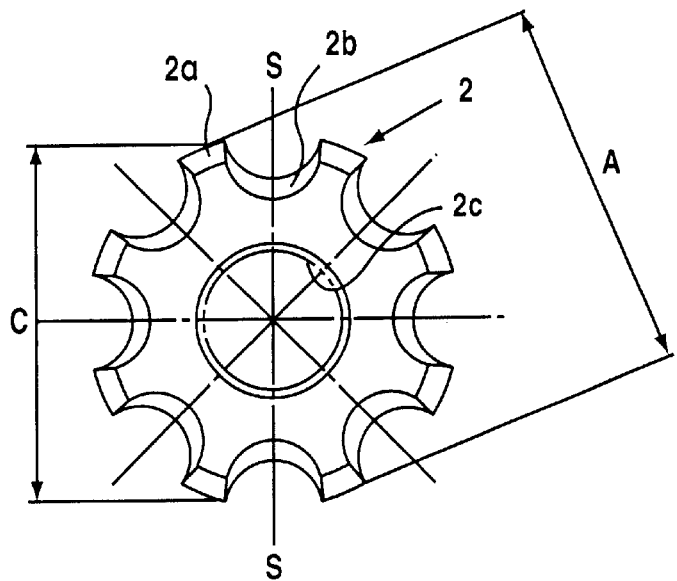
FIG. 3A is a front view of an inner ring.
Figure 3B:
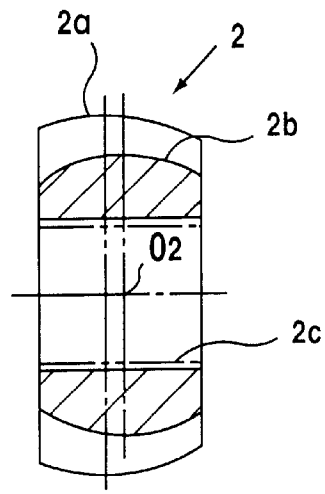
FIG. 3B is a longitudinal view of the inner ring.

FIGS. 3A and 3B show the inner joint member 2. The diameter of the outer surface 2a of the inner joint member 2 is A, and the maximum distance across the outer surface 2a in a longitudinal section parallel with the plane S including the bottoms of two diametrically opposite guide grooves 2b is C.

Figure 4A:
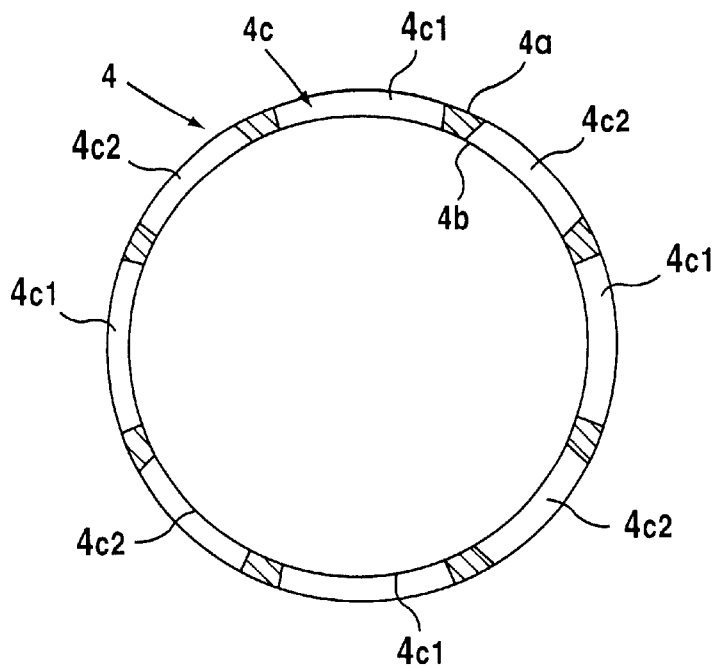
FIG. 4A is a cross section of a cage.
Figure 4B:
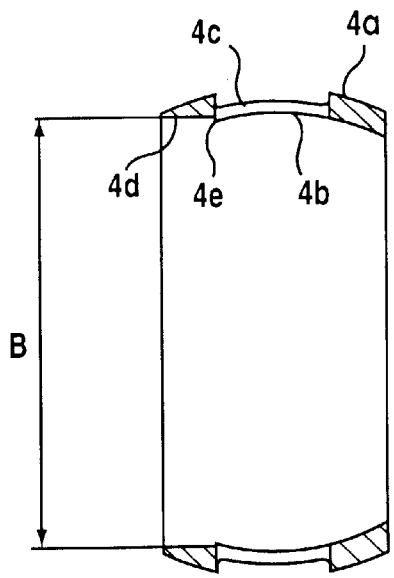
FIG. 4B is a longitudinal section of the cage.
Figure 5:
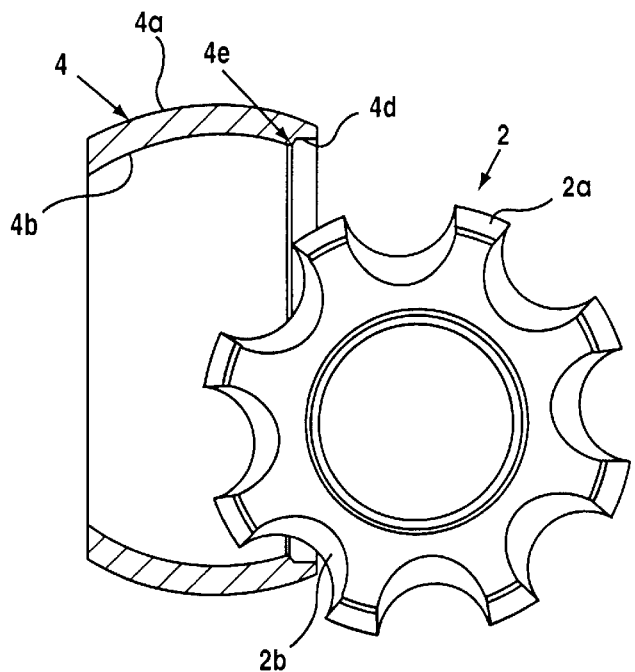
FIG. 5 is a view showing how to incorporate the inner ring into the cage.
Figure 6A:
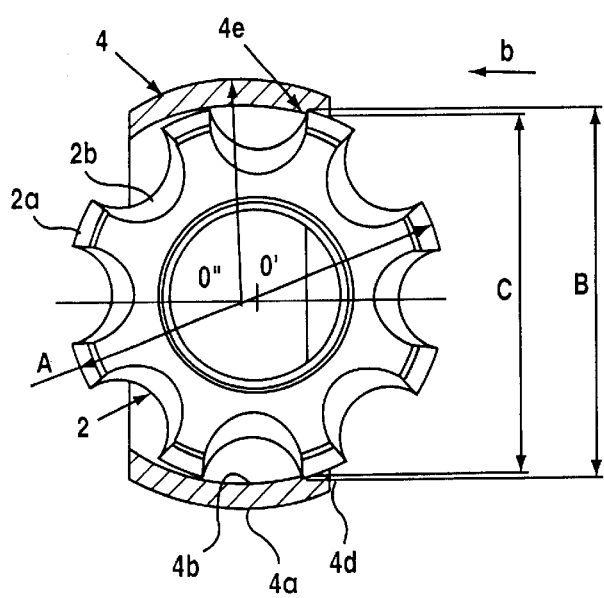
FIGS. 6A and 6B are views showing how to incorporate the inner ring into the cage.
Figure 6B:
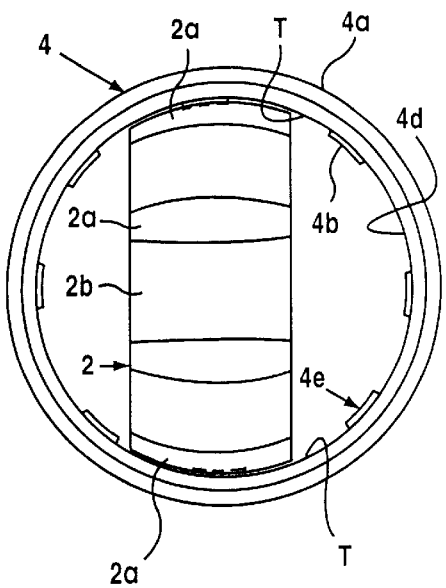

FIGS. 4A and 4B show the cage 4. The cage 4 is provided with 8 circumferentially equispaced window-like pockets 4c which hold 8 torque transmitting balls 3. Of the 8 pockets 4c, four are long pockets 4c1 having a large circumferential length and the remaining four are short pockets 4c2 having a small circumferential length, said long and short pockets 4c1 and 4c2 alternating with each other. In this arrangement, the angular spacing of the four short pockets 4c2 is 90 degrees. In addition, the arrangement may be such that of the 8 pockets 4c, six may be long pockets 4c1 and the remaining two may be short pockets 4c2. In this case, the spacing between the two short pockets 4c2 is 180 degrees. The circumferential length of the short pockets 4c2 is set such that when this constant velocity joint transmits torque at the greatest angle (the greatest operating angle which is functionally allowable as a joint, that is the "maximum operating angle" or the basis is founded on the greatest operating angle which is operatively allowable within the range of the "maximum operating angle"), the torque transmitting balls 3 do not interfere with the circumferential wall surface of the short pockets 4c2. Further, the circumferential length of the long pockets 4c1 is set such that during the incorporation of the torque transmitting balls 3 which is effected by relatively tilting the outer and inner joint members 1 and 2 to cause one short pocket 4c2 to face outward through the opening in the outer joint member 1, previously incorporated torque transmitting balls 3 do not interfere with the circumferential wall surfaces of the long pockets 4c1. Further, as shown in FIGS. 5, 6A and 6B, the diameter (B) of the inlet 4d of the cage 4 for incorporation of the inner joint member 2 is set with respect to the outer diameter (A) of the inner joint member 2 shown in FIG. 3A and to the maximum spacing (C) such that the relation $C \leq B < A$ is established. Defined in the innermost region of the inlet 4d (i.e., in the boundary between the inner surface 4b and the inlet 4d) is a step 4e. However, it is also possible to employ a configuration having no such step 4e.

Figure 7B:
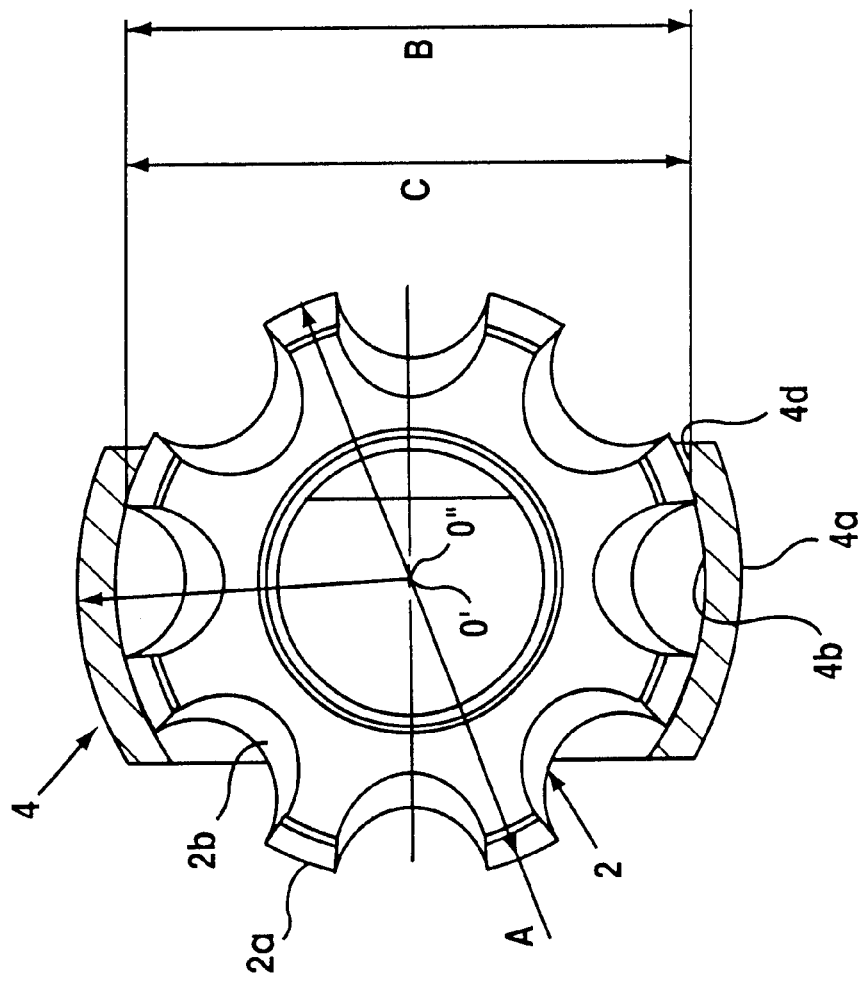
FIG. 7B is a view showing how to incorporate the inner ring into such cage.
Figure 7A:
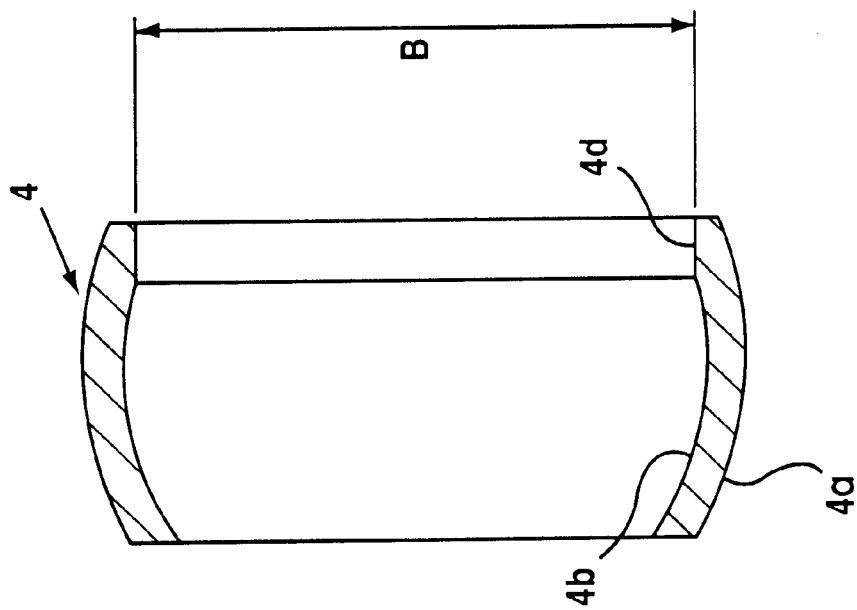
FIG. 7A is a longitudinal section showing another form of a cage.

The setting of the diameter (B) of the inlet 4d within the range $C \leq B < A$ stems from the necessity of securing the durability and strength of the cage and of making allowances for incorporating the inner joint member 2 into the inner surface 4b of the cage 4. In incorporation of the inner joint member 2, as shown in FIG. 6, with the axes positioned to intersect at right angles with each other, the inner joint member 2 is inserted in the inner surface 4b of the cage 4 while abutting the guide grooves 2b of the inner joint member 2 against the inlet 4d of the cage 4. When the inner joint member 2 is inserted to some extent in this manner, as shown in FIG. 6A, the maximum spacing (C) across the outer surface 2a of the inner joint member 2 is caught by the step 4e, allowing no further insertion of the inner joint member 2. At this time, the spherical center O' of the outer surface 2a of the inner joint member 2 and the spherical center O" of the inner surface 4b of the cage 4 are somewhat shifted from each other. Thereafter, the inner join member 2 is turned through 90 degrees by utilizing the lateral portion T of the step 4e of the cage 4 shown in FIG. 6B, until the axis of the inner joint member 2 and the axis of the cage 4 coincide with each other. Thereby, the inner joint member 2 is completely incorporated into the inner surface 4b of the cage 4. In addition, as shown in FIGS. 7A and 7B, also in the case of a cage 4 having no step 4e, the parts can be assembled in the same manner as the above. In this case, with the axis of the inner joint member 2 positioned to intersect at right angles with the axis of the cage 4, incorporation can be continued until the spherical center O' of the outer surface 2a of the inner joint member 2 and the spherical center O" of the inner surface 4b of the cage 4 coincide with each other. Thereafter, the inner joint member 2 is turned through 90 degrees with respect to the cage 4 until their axes coincide, the advantage being that the operation involved is easy.

Generally, in this type of constant velocity joint, in order to incorporate the inner joint member into the inner surface of the cage, the circumferential length of one of the pockets of the cage or two diametrically opposite pockets is made greater than the axial length of the inner joint member. And the incorporation is effected such that with the axes of the inner joint member and cage positioned to intersect at right angles with each other, while inserting an outer surface portion of the inner joint member (a portion between circumferentially adjoining guide grooves) into said pockets of increased circumferential length, the operator inserts the inner joint member into the inner surface of the cage, and turning the inner joint member through 90 degrees with respect to the cage. However, according to the construction and method of incorporation of such cage, the necessity of making the circumferential length of at least one pocket of the cage greater than the axial length of the inner joint member leads to the reduction of the area of the inner and outer surfaces of the cage and the reduction of the circumferential thickness of the post portion between pockets. This is not preferable for the durability and strength of the cage. According to the construction and method of incorporation of the cage in the embodiment described above, since there is no need to provide a pocket which has a greater circumferential length than the axial length of the inner joint member, the necessary areas of the inner and outer surfaces of the cage and the circumferential thickness of the post between pockets can be secured to increase the durability and strength of the cage. Particularly, in the arrangement having 8 torque transmitting balls 3 as in the constant velocity joint of the present invention, the number of pockets 4c of the cage 4 larger than that in the comparative article (6-ball constant velocity joint); therefore, the securing of the durability and strength of the cage is important.

Figure 8A:
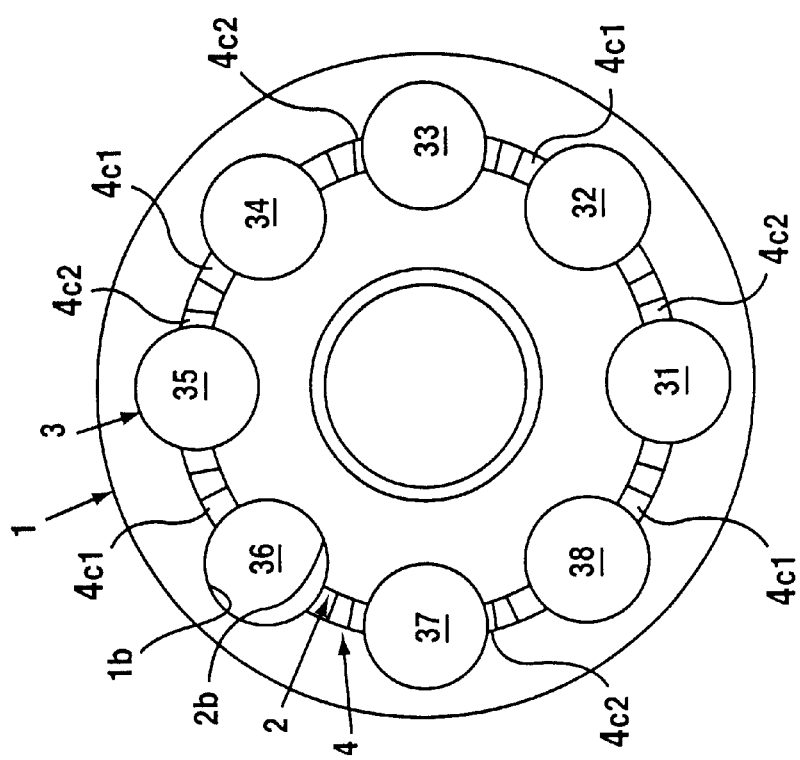
FIG. 8A and 8B are views showing how to incorporate balls into the pockets of the cage.

The provision of two types of pockets 4c of the cage 4, i.e., long pockets 4c1 and short pockets 4c2 is intended to secure the durability and strength of the cage and to make allowances for incorporation of the torque transmitting balls 3 into the pockets 4c of the cage 4. In this type of constant velocity joints, incorporation of the torque transmitting balls 3 is effected by incorporating the assembly of cage 4 and inner joint member 2 into the inner surface 1a of the outer joint member 1 (FIG. 2A) and then, as shown in FIG. 8A, angularly displacing the inner joint member 2 (and the cage 4) with respect to the outer joint member 1.

Now, in this type of constant velocity joints, when the outer and inner joint members transmit torque between each other while taking an operating angle θ, the torque transmitting balls move circumferentially and radially within the pockets of the cage as the phase in the direction of rotation changes. And the amount of movement of the torque transmitting balls increases in proportion to the operating angle θ, the latter being greatest when the torque transmitting balls are incorporated (the operating angle θ at this time is referred to as the "ball incorporation angle α", the "ball incorporation angle α" is greater than the "maximum operating angle" which is the greatest operating angle which can be taken by the joint while performing the function as the joint). Therefore, the amount of movement, particularly the amount of circumferential movement, of the torque transmitting balls is the greatest when the joint takes the ball incorporation angle α; thus, it is necessary to take into account the amount of circumferential movement of the torque transmitting balls when setting the circumferential length of the pockets of the cage.

Figure 8B:
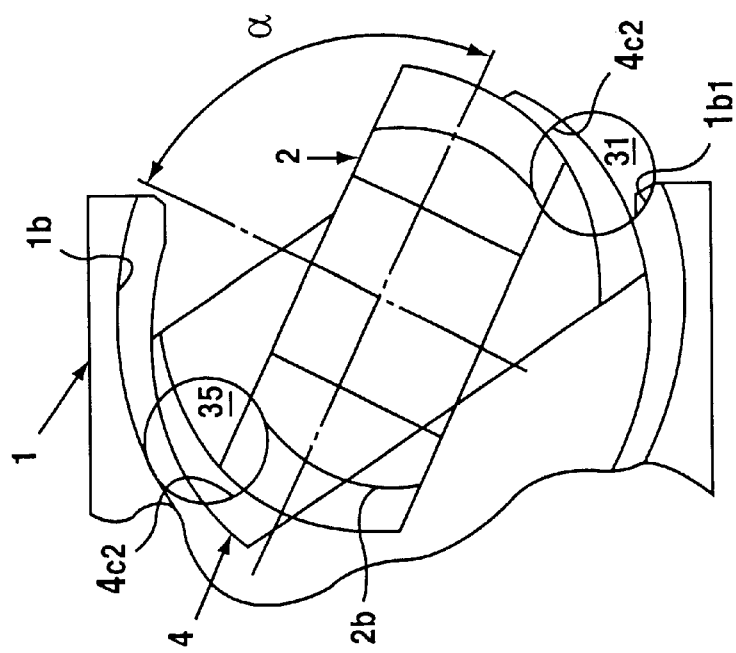
Figure 9A:
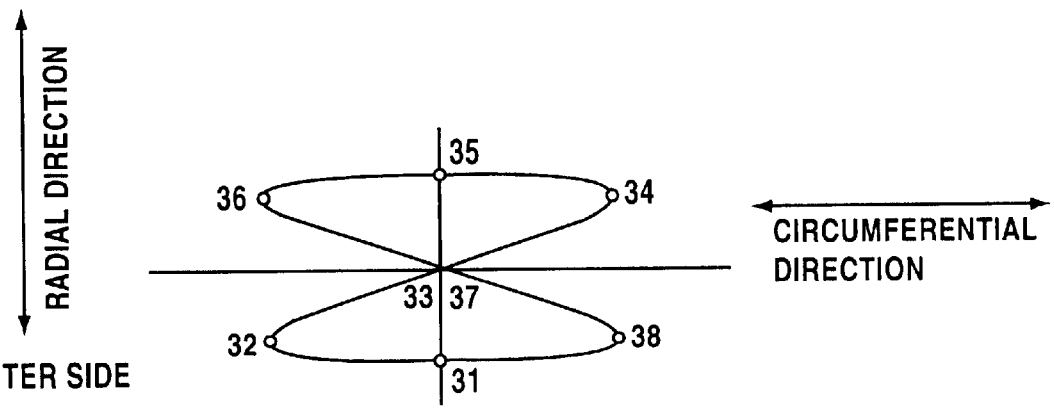
FIGS. 9A and 9B are views showing the movement of the balls in the pockets when the operating angle is α, FIG. 9A corresponding to an arrangement in which the cage is not provided with an offset, FIG. 9B corresponding to an arrangement in which the cage is provided with an offset.
Figure 9B:
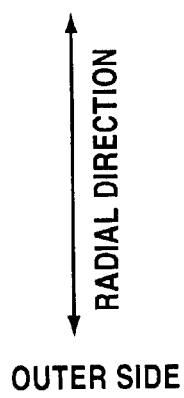

In FIG. 8B, the torque transmitting balls 3 are shown at 31, 32, . . . , 38 in the various phases in the direction of rotation. The torque transmitting balls 31, 33, 35, 37 are stored in the short pockets 4c2 and the balls 32, 34, 36, 38 are stored in the long pockets 4c1. The respective displaced positions of the torque transmitting balls 3 in the pockets 4c in different phases when the joint takes the incorporation angle α are as shown in FIG. 9A. In addition, FIG. 9A shows how the torque transmitting balls move in the arrangement in which the spherical centers of the outer surface 4a and inner surface 4b are not offset (the arrangement in which the spherical centers are located in the joint center plane O), as in the case of the cage 4 in this embodiment, and FIG. 9B show how the torque transmitting balls move in the arrangement in which the inner and outer surfaces of the cage are axially offset an equal amount with respect to the joint center plane O.

The torque transmitting balls are incorporated, first, in the four long pockets 4c1 and then in the short pockets 4c2. For example, as shown in FIG. 8A, when the torque transmitting ball 31 is to be incorporated into the short pocket 4c2, the amount of circumferential movement of the torque transmitting ball is large in the phases of 32, 34, 36, 38 and small in the phases of 33, 35, 37 (FIGS. 9A and 9B). As described above, the circumferential length of the long pockets 4c1 (positioned in the phases of 32, 34, 36, 38 in FIG. 8B) is set such that when a torque transmitting ball 3 is incorporated into one short pocket 4c2 (positioned in the phase of 31 in FIG. 8b), the previously incorporated torque transmitting ball does not interfere with the circumferential wall surfaces of the long pockets 4c1. Further, in the phase positioned in the short pockets 4c2 (33, 35, 37 in FIG. 8B), the amount of circumferential movement of the torque transmitting balls 3 is small. Therefore, the torque transmitting ball 31 can be incorporated into the short pocket 4c2. Likewise, when the torque transmitting ball 33, for example, is to be incorporated, the long pockets 4c1 are positioned in the phases of 32, 34, 36, 38, and in the phases of 31, 35, 37, the amount of circumferential movement of the torque transmitting balls 3 is small. Therefore, the torque transmitting ball 33 can be incorporated into the short pocket 4c2. In this manner, torque transmitting balls 3 can be incorporated into all short pockets 4c2. (Since torque transmitting balls have previously been incorporated into the long pockets 4c1, it follows that the torque transmitting balls 3 can be incorporated into all pockets 4c.) In addition, when the balls 3 are being incorporated into the pockets 4c, the chamfer 1b 1 of the outer joint member 1 serves to guide the balls 3 (see FIG. 8A).

Generally, in this type of constant velocity joints, the circumferential length of the pockets of the cage is set on the basis of the maximum amount of circumferential movement of the torque transmitting ball in the pocket during the ball incorporation (as described above, the circumferential length of at least one pocket is made greater than the axial length of the inner joint member), and this leads to the reduction of the area of the inner and outer surfaces of the cage and the reduction of the circumferential thickness of the post between pockets and being not preferable from the viewpoint of the durability and strength of the cage. In this respect, in the constant velocity joint of this embodiment, the circumferential length of the long pockets 4c1 of the cage 4 is set on the aforesaid basis, and circumferential length of the short pockets 4c2 is set on the basis of the maximum amount of circumferential movement of the torque transmitting ball 3 in the pocket during the transmission of torque with the constant velocity joint taking the maximum angle (this angle is smaller than the "ball incorporation angle α"). Such arrangement makes it possible to secure the areas of the inner and outer surface of the cage, the circumferential thickness of the post between pockets, and the durability and strength of the cage.

Figure 10:
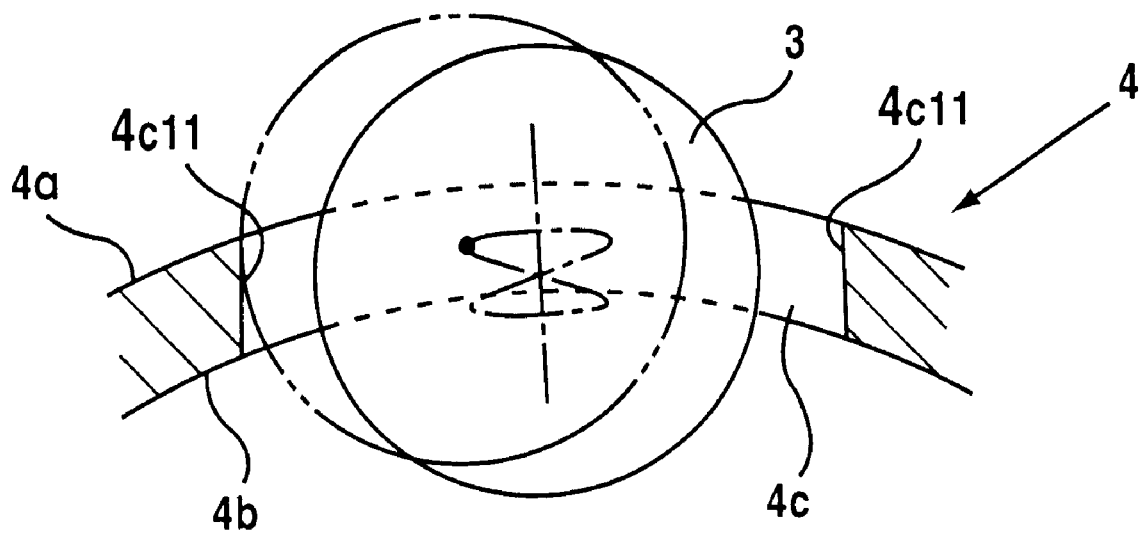
FIG. 10 is a partial enlarged cross section showing the vicinity of a pocket in the cage.

Further, in the arrangement in which the spherical centers of the outer and inner surfaces 4a and 4b are not offset as in the cage 4 of this embodiment, since the movements of the torque transmitting balls 3 in the pockets, as shown in FIG. 9A, are the same for the inner and outer surfaces of the cage, the two circumferential wall surfaces 4c11 of the pockets 4c may be made in the form of parallel flat surfaces (FIG. 10A), or concavely curved surfaces corresponding to the surface curvature of the torque transmitting balls.

When the outer joint member 1, inner joint member 2, cage 4, and torque transmitting balls have been assembled in the manner described above, the constant velocity joint of this embodiment shown in FIGS. 1A and 1B is completed. The serrations (or splines) 2c of the inner joint member 2 have the shaft 5 connected thereto. In addition, in this embodiment, the shaft 5 is made of boron steel to reduce the size of the shaft 5 (the diameter of the portion which interferes with the open end of the outer joint member is reduced, the diameter of the serrated portion being the same as that of the comparative article). The intention for reduction of the diameter of the shaft 5 is to make allowances for the in creasing operating angle. In a trial model, a maximum operating angle of greater than 45° required for a drive shaft joint for automobiles.

Figure 11A:
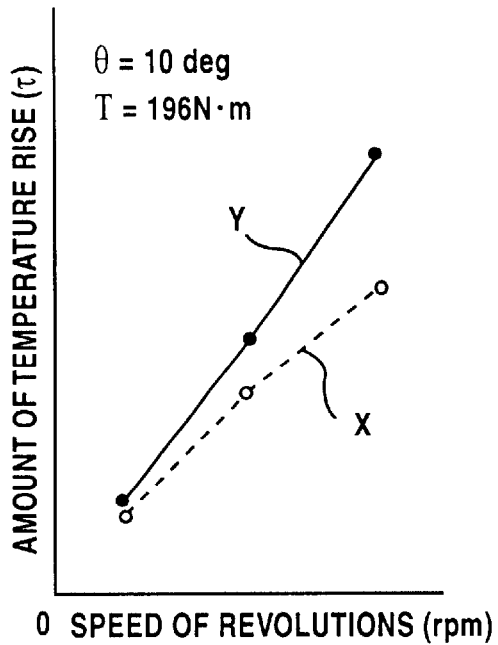
FIGS. 11A, 11B and 11C are graphs showing the relation between rpm and temperature rise.
Figure 11B:
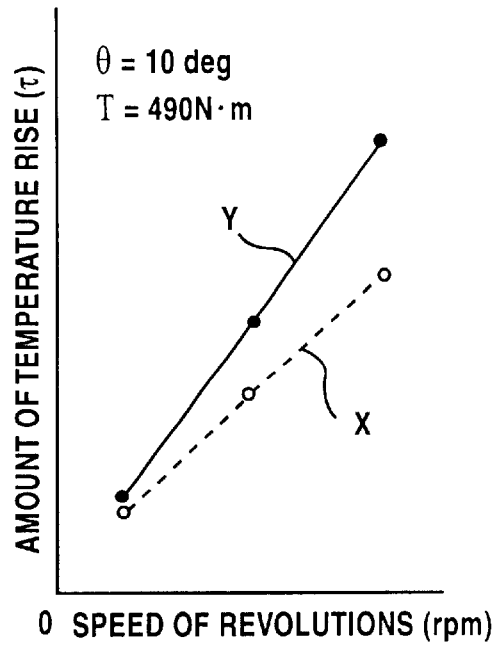
Figure 11C:
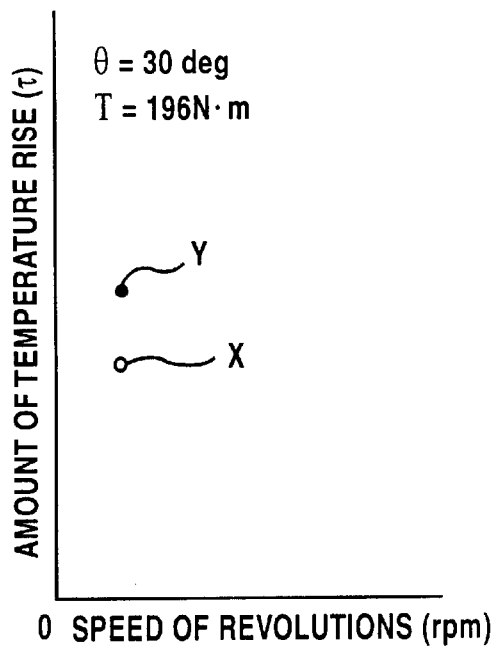

FIGS. 11A through 11C show the results of comparative tests of the embodiment article and the comparative article (6-ball constant velocity joint) for the relation between rpm and temperature rise (°C.). In the figures, X (dotted line with white circles ○) refers to the embodiment article and Y (solid line with black circles ○) refers to the comparative article, and the temperature rise (°C.) was measured 30 minutes after the start of operation. And θ is the operating angle of the joint and T is the input rotation torque.

As is clear from the test results shown in the figures, the temperature rise in the embodiment article (X) is lower than that in the comparative article (Y), the difference therebetween increasing with increasing rpm. Reduction of temperature leads to improved durability. Further, it is thought that such reduction of temperature rise can be attained irrespective of the operating angle (θ) and input rotation torque (T).

Figure 12:
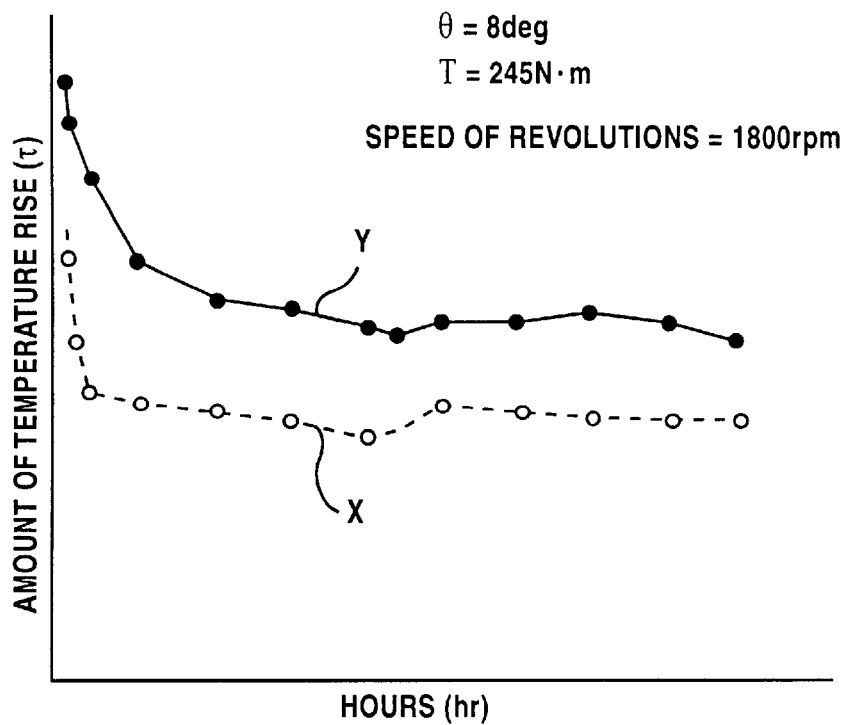
FIG. 12 is a graph showing the time-dependent change of temperature rise.

FIG. 12 shows the results of tests of the embodiment article and the comparative article (6-ball constant velocity joint) (both being of the same nominal size) for the time-dependent change of temperature rise. In the figure, X (dotted line with white circles ○) refers to the embodiment article and Y (solid line with black circles ○) refers to the comparative article, and θ is the operating angle of the joint and T is the input rotation torque.

As is clear from the test results shown in the figure, the temperature rise in the embodiment article (X) is relatively lower than that in the comparative article (Y), the difference therebetween not changing so much even if the operating time prolongs.

Figure 13:
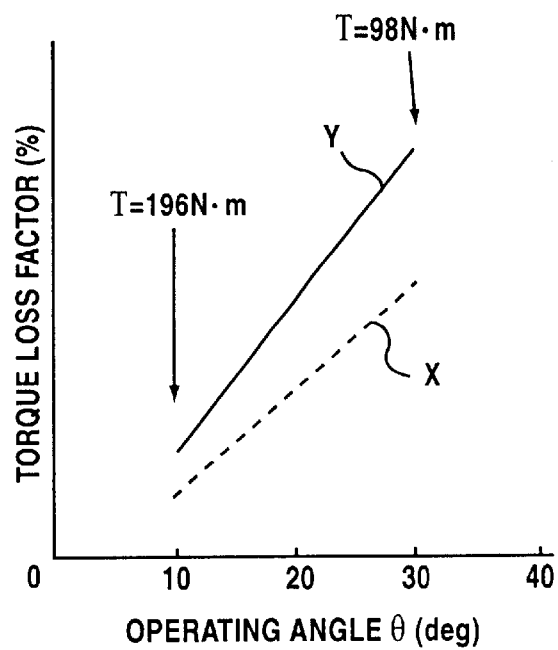
FIG. 13 is a graph showing the relation between the operating angle and torque loss factor.

FIG. 13 show the results of comparative tests of the embodiment article and the comparative article (6-ball constant velocity joint) (both being of the same nominal size) for the relation between the operating angle θ (in degrees) and torque loss factor (%). In the figures, X (dotted line with white circles ○) refers to the embodiment article and Y (solid line with black circles ●) refers to the comparative article, and the torque loss factor was measured at the input rotation torque=196 N·m, for θ=10 degrees, and at T=98 N·m for θ=30 degrees.

As is clear from the figure the torque loss factor for the embodiment article (X) is smaller than that of the comparative article (Y), the difference therebetween increasing with increasing operating angle θ. The reduction of torque loss factor contributes to fuel saving and energy saving and also to reduction of temperature rise and hence to improved durability as well.

Figure 14:
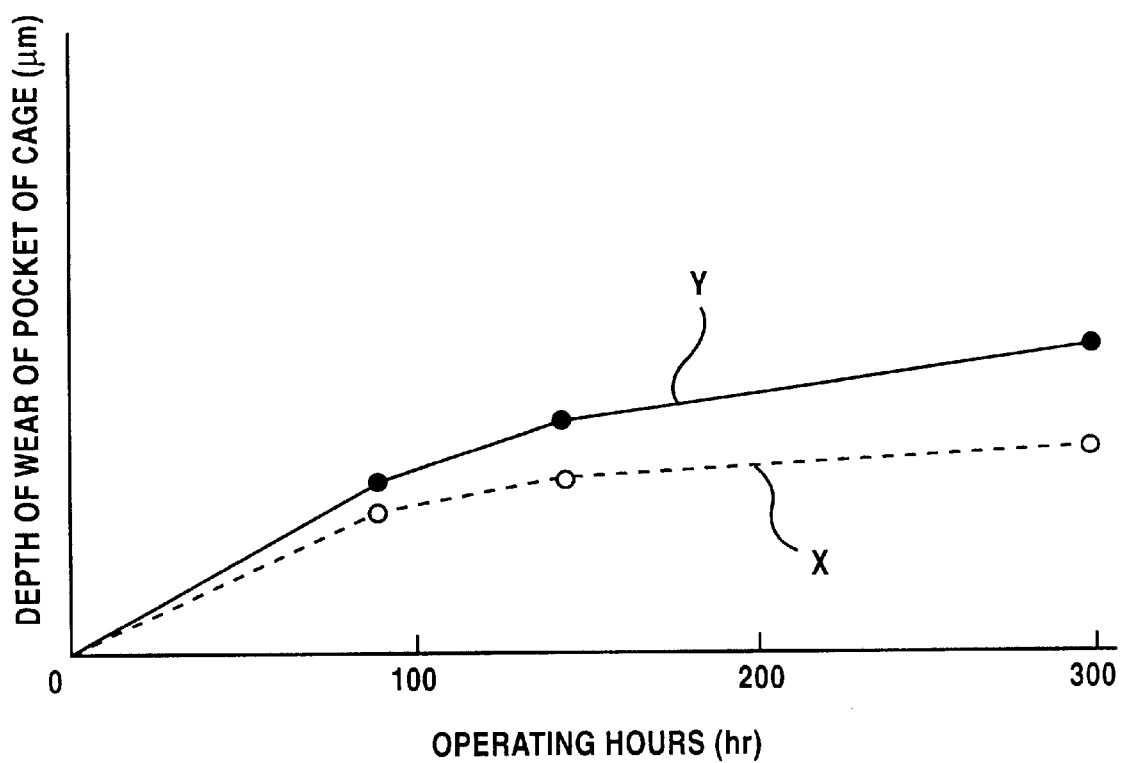
FIG. 14 is a graph showing the relation between the operating time and the depth of wear of the pockets of the cage.

Table 3 (FIG. 24C) shows the results of observation, regarding the embodiment article and the comparative article (6-ball constant velocity joint) (both being of the same nominal size), of how the outer joint member, inner joint member, cage and torque transmitting balls were damaged 300 hours after operation. As for the cage, the depth of wear in the pockets was measured, and the results are shown in FIG. 14. The test conditions were that operating angle θ=6 degrees, input rotation torque T=1078 N·m, rpm=200, and total number of revolutions =3.60×10$^6$. In addition, the test were conducted using two test articles respectively for the embodiment article and for the comparative article (embodiment articles being indicated by Nos. 1 and 2 and the comparative articles by the Nos. 3 and 4), and the depth of wear shown in FIG. 14 is the mean value for the two test articles.

As is clear from the results shown in Table 3, there was no damage found in any part of both the embodiment articles and the comparative articles. Further, as is clear from the results shown in FIG. 11, the depth of wear in the pockets of the cage in the embodiment article (X) was less than that in the comparative article (Y).

As has been described so far, the constant velocity joint of this embodiment is compact in shape and yet Its load capacity and durability are at least as high as in the comparative article (6-ball constant velocity joint).

Figure 15A:
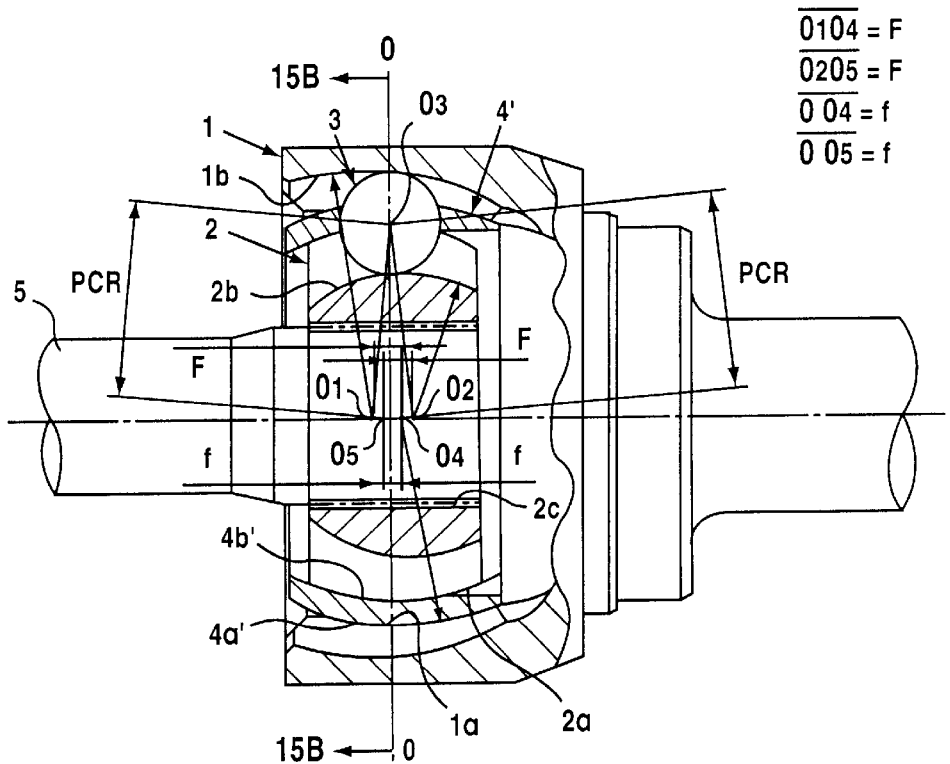
FIG. 15A is a longitudinal section showing a constant velocity joint according to a second embodiment of the invention.
Figure 15B:
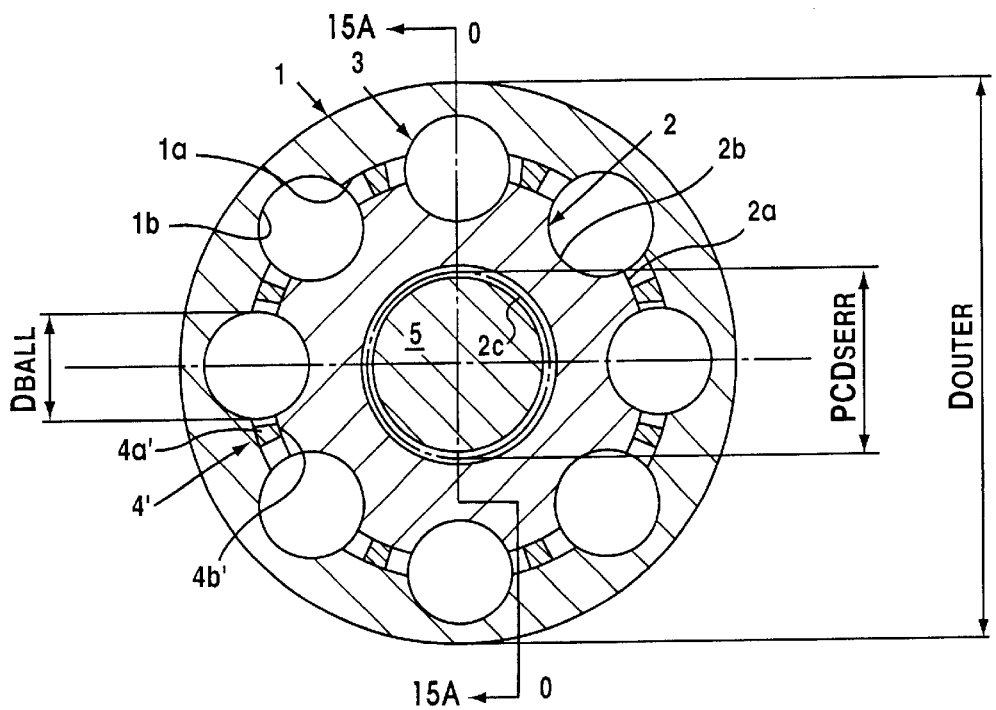
FIG. 15B is a cross section thereof.

FIGS. 15A and 15B show a constant velocity joint according to another embodiment of the invention. The centers O1 and O2 of the guide grooves 1b and 2b of the outer and inner joint members 1 and 2, respectively, are offset with respect to the spherical centers O4 and O5 of the inner and outer surfaces 1a and 2a, respectively, axially by an equal distance F in opposite directions.

Further, in this embodiment, the spherical center of the outer surface 4a' of the cage 4' (which is the same as the spherical center O4 of the inner surface 1a of the outer joint member 1) and the spherical center of the inner surface 4b' of the cage 4' (which is the same as the spherical center O5 of the outer surface 2a of the inner joint member 2) are offset axially by an equal distance (f) in opposite directions from the center O of the joint. The offset (F) in the outer joint member 1 is the axial distance between the center O1 of the guide grooves 1b and the spherical center O4 of the inner surface 1a and offset (F) in the inner joint member 2 is the axial distance between the center O2 of the guide grooves 2*b* and the spherical center O5 of the outer surface 2*a*, and the two are equal. The length of the line segment connecting the center O1 of the guide groove 1*b* of the outer joint member 1 and the center of the torque transmitting ball 3, and the length of the line segment connecting the center O2 of the guide groove 2*b* of the inner joint member 2 and the center O3 of the torque transmitting ball 3 are each equal to PCR; thus, the two are equal.

It is recommendable that the offset (f) in the outer surface 4*a*' and inner surface 4*b*' of the cage 4' be set as follows.

As described above, ④ it is preferable from the viewpoint of securing the cage strength and durability that the offset (f) in the outer surface 4*a*' and inner surface 4*b*' be set such that the ratio R2 (=f/PCR) is within the range 0<R2≦0.052. In this embodiment, however, R2 is set at 0.035. As for the arrangements ①, ②, ③ in the above embodiment, they are the same (however, regarding the arrangement ③, is set at 0.1003), and a description thereof is omitted. In addition, the direction of the offset (f) in the cage 4' may be reversed. That is, the point O4 in FIG. 15A may be the same as the spherical center of the inner surface 4*b*' and the point O5 may be the same as the spherical center of the outer surface 4*a*'.

Figure 16:
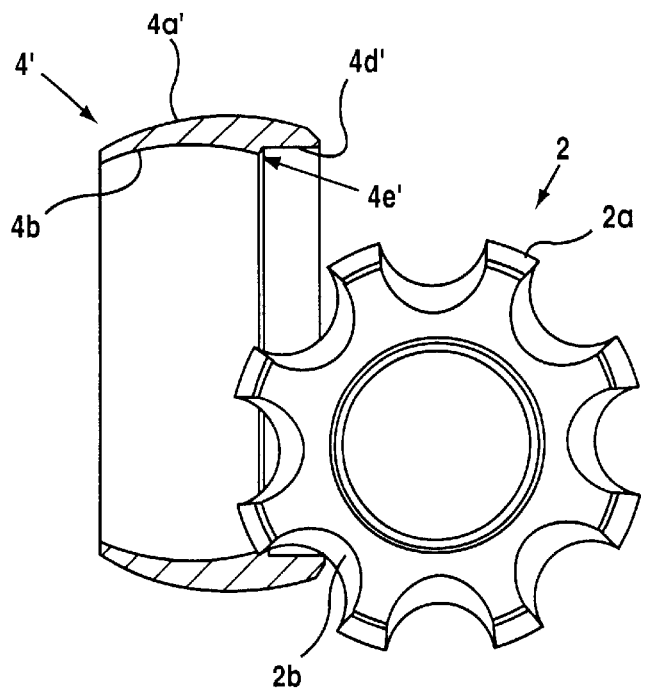
FIG. 16 is a view showing how to incorporate the inner ring into the cage.
Figure 17A:
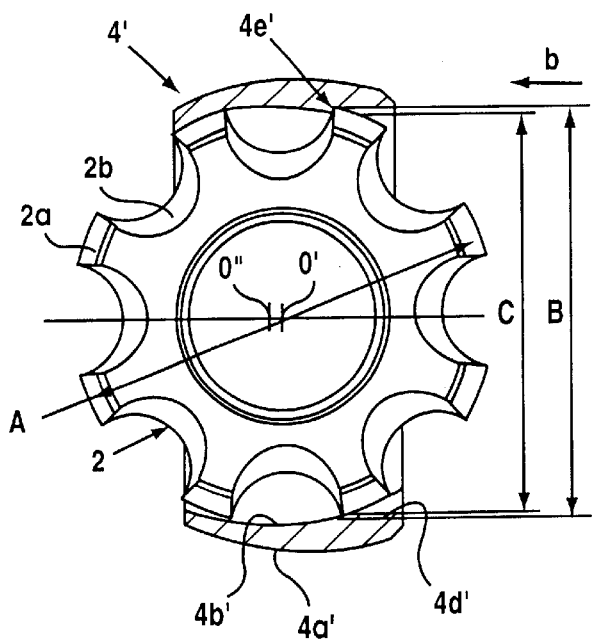
FIGS. 17A and 17B are views showing how to incorporate the inner ring into the cage.
Figure 17B:
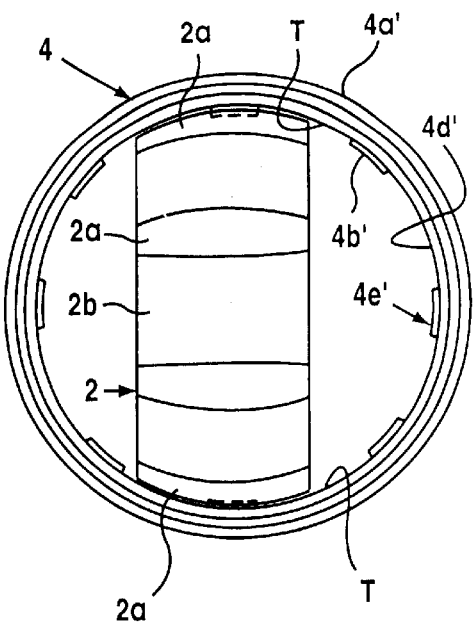
Figure 18A:
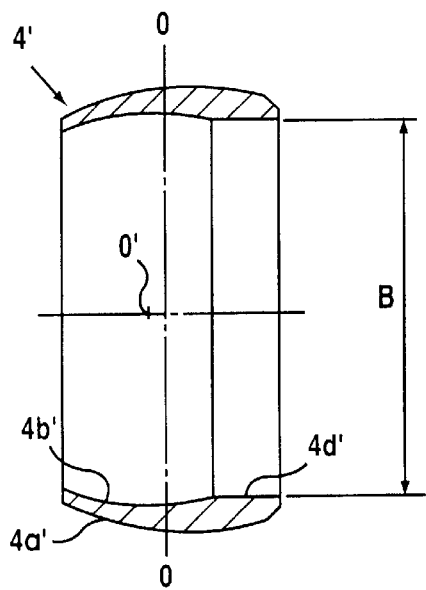
FIG. 18A is a longitudinal section showing another form of a cage.
Figure 18B:
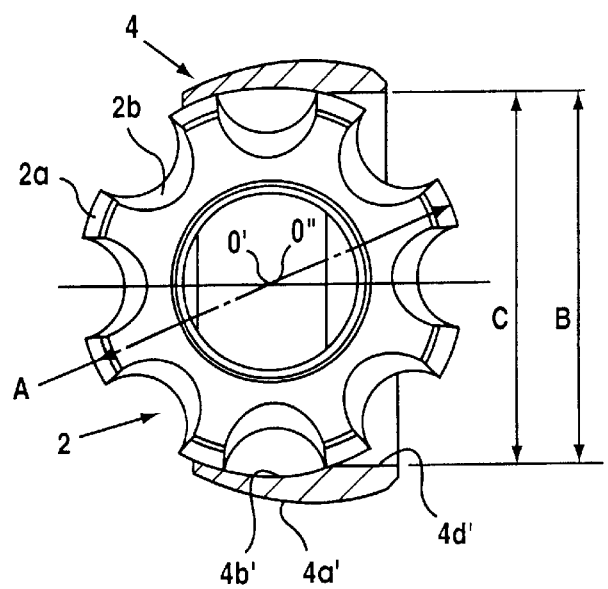
FIG. 18B is a view showing how to incorporate the inner ring into such cage.

In the cage 4' of this embodiment also, as in the case of the cage 4 in the embodiment described above, the diameter (B) of the inlet 4*d*' for incorporating the inner joint member 2 is set with respect to the outer diameter (A) of the inner joint member and the maximum spacing (C) such that C≦B<A (FIG. 17A). Defined in the innermost region of the inlet 4*d*' (i.e., in the boundary between the inner surface 4*b*' and the inlet 4*d*') is a step 4*e*'. However, It is also possible to employ a configuration having no such step 4*e*. In incorporation of the inner joint member 2, as shown in FIG. 16, with the axes positioned to intersect at right angles with each other, the inner joint member 2 is inserted in the inner surface 4*b*' of the cage 4' while abutting one guide groove 2*b* of the inner joint member 2 against the inlet 4*d*' of the cage 4'. When the inner joint member 2 is inserted to some extent in this manner, as shown in FIG. 17A, the maximum spacing (C) across the outer surface 2*a* of the inner joint member 2 is caught by the step 4*e*', allowing no further insertion of the inner joint member 2. At this time, the spherical center O' of the outer surface 2*a* of the inner joint member 2 and the spherical center O" of the inner surface 4*b*' of the cage 4' are somewhat shifted from each other. Thereafter, the inner join member 2 is turned through 90 degrees by utilizing the lateral portion T of the step 4*e*' of the cage 4' showing in FIG. 6B, until the axis of the inner joint member 2 and the axis of the cage 4' coincide with each other. Thereby, the inner joint member 2 is completely in corporated into the inner surface 4*b*' of the cage 4'. In addition, as shown in FIGS. 18A and 18B, also in the case of a cage 4' having no step 4*e*', the parts can be assembled in the same manner as the above.

Figure 19A:
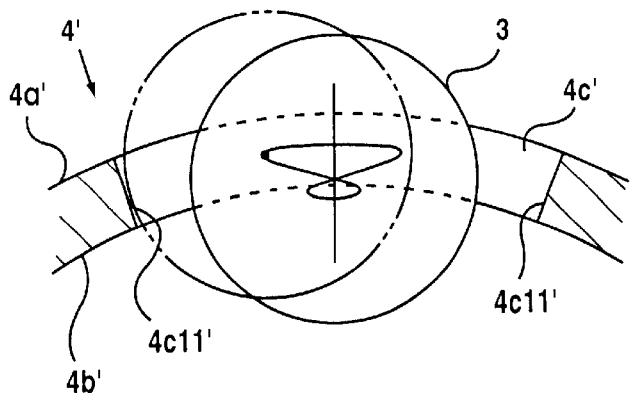
FIGS. 19A and 19B are partial enlarged cross section showing the vicinity of a pocket in the cage.
Figure 19B:
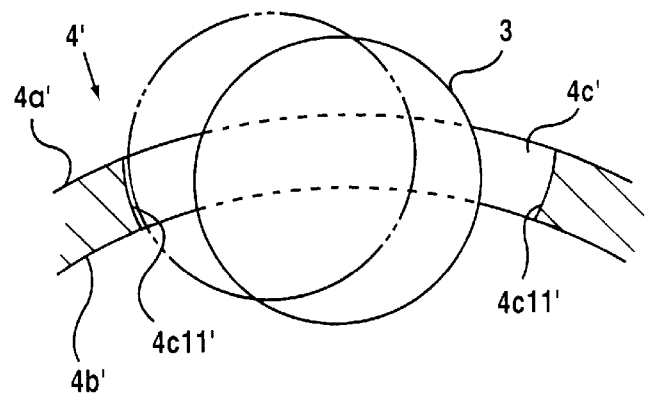

Further, the cage 4' in this embodiment has 8 pockets for storing 8 torque transmitting balls, said 8 pockets consisting of two types of pockets, long and short, having their circumferential lengths determined on the same basis as in the preceding embodiment. The respective numbers of short and long pockets, their disposition and their wall shape are the same as in the preceding embodiment. Further, incorporation of the torque transmitting balls 3 into the pockets is effected in the manner shown in FIGS. 8A and 8B as in the preceding embodiment. With the arrangement of this embodiment, however, since the spherical centers O4 and O5 of the outer and inner surfaces 4*a*' and 4*b*' of the cage 4' are offset to the positions shown in FIG. 15A, the movements of the torque transmitting balls 3 in the pockets during the ball incorporation are at their greatest on the outer surface side, as shown in FIG. 9B. In such case, it is recommendable that as shown in FIGS. 19A and 19B, the two circumferential wall surfaces 4*c*11' of the pocket 4*c*' be in the form of inclined surfaces sloping enlarged toward the outer surface of the cage 4'. FIG. 19A shows an arrangement in which the two wall surfaces 4*c*11' are flat surfaces, and FIG. 19B shows an arrangement in which the two wall surfaces are curved surfaces corresponding to the curvature of the surface of the torque transmitting balls 3. As compared with the case where the two circumferential wall surfaces 4*c*11' of the pocket are parallel surfaces (see FIG. 10), this arrangement is advantageous from the viewpoint of securing the strength and durability of the cage in that the area of the inner surface 4*b*' of the cage 4' (the area of the post associated with the inner surface side) increases.

Figure 20A:
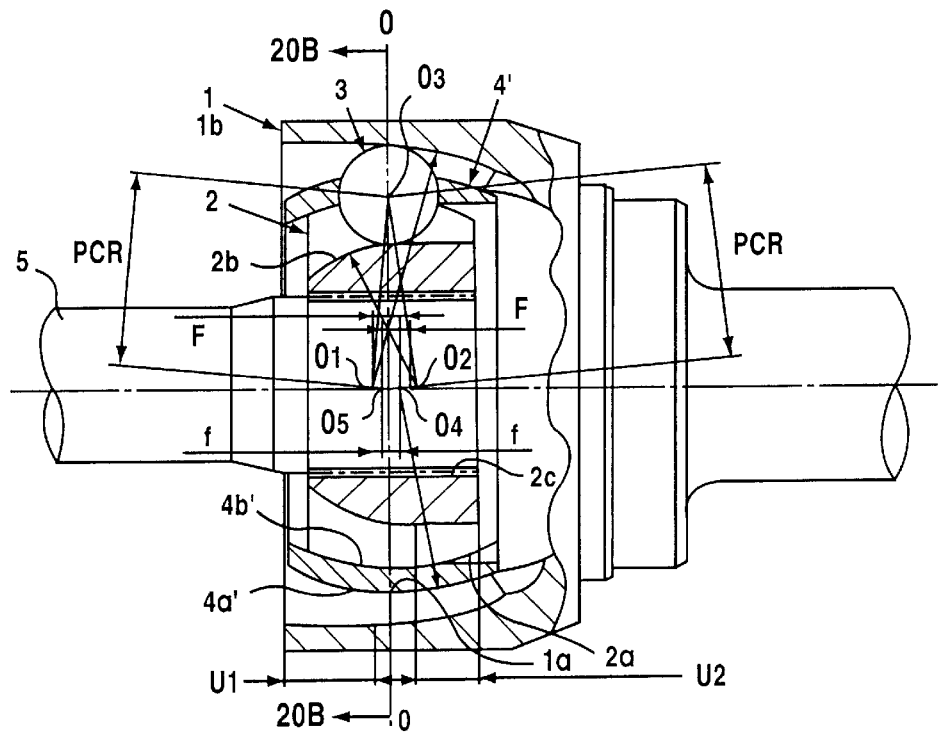
FIG. 20A is a longitudinal section showing a constant velocity joint according to a third embodiment of the invention.
Figure 20B:
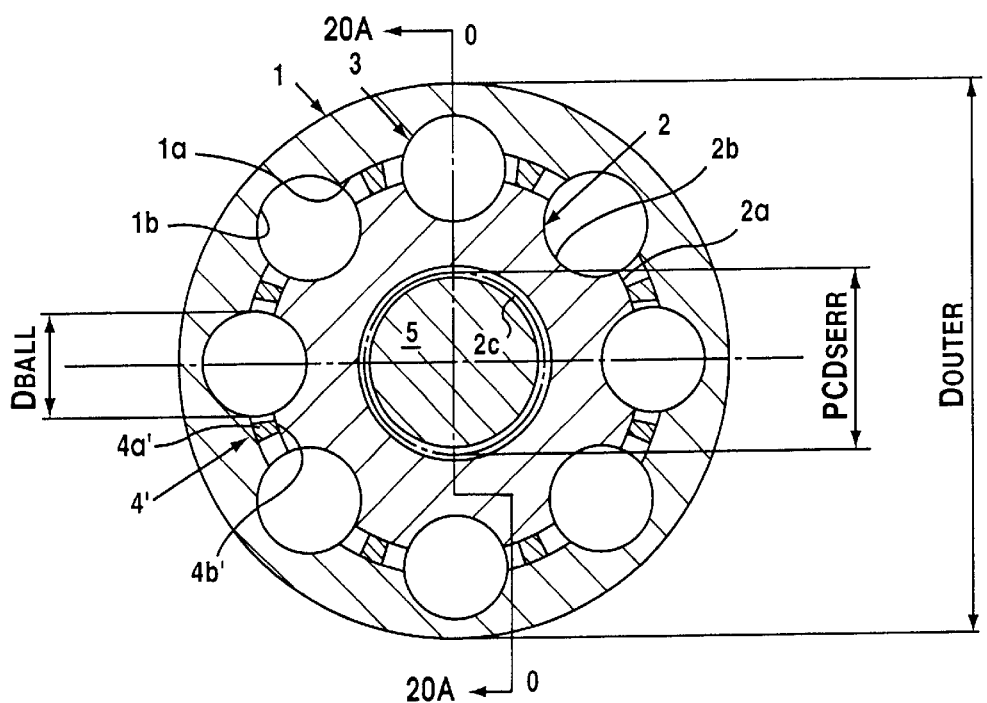
FIG. 20B is a cross section thereof.

In an embodiment shown in FIGS. 20A and 20B, a predetermined regions U1 and U2 of the guide grooves 1*b* and 2*b* of the outer and inner joint members 1 and 2 are straight. The region of the guide groove 1*b* other than the region U1 is curved with the center at point O1 and the region of the guide groove 2*b* other than the region U2 is curved with the center at point O2. The rest of the arrangement is the same as in the embodiment shown in FIGS. 15A and 15B, and a description thereof is omitted.

In this connection, it is to be noted that the constant velocity joints described in the above embodiments can be widely used as a power transmission component in automobiles and various industrial machines and instruments and particularly they are useful for use in the power transmitting device of automobiles, for example, as a joint for connecting the drive shaft or propeller shaft of an automobile.

Figure 21:
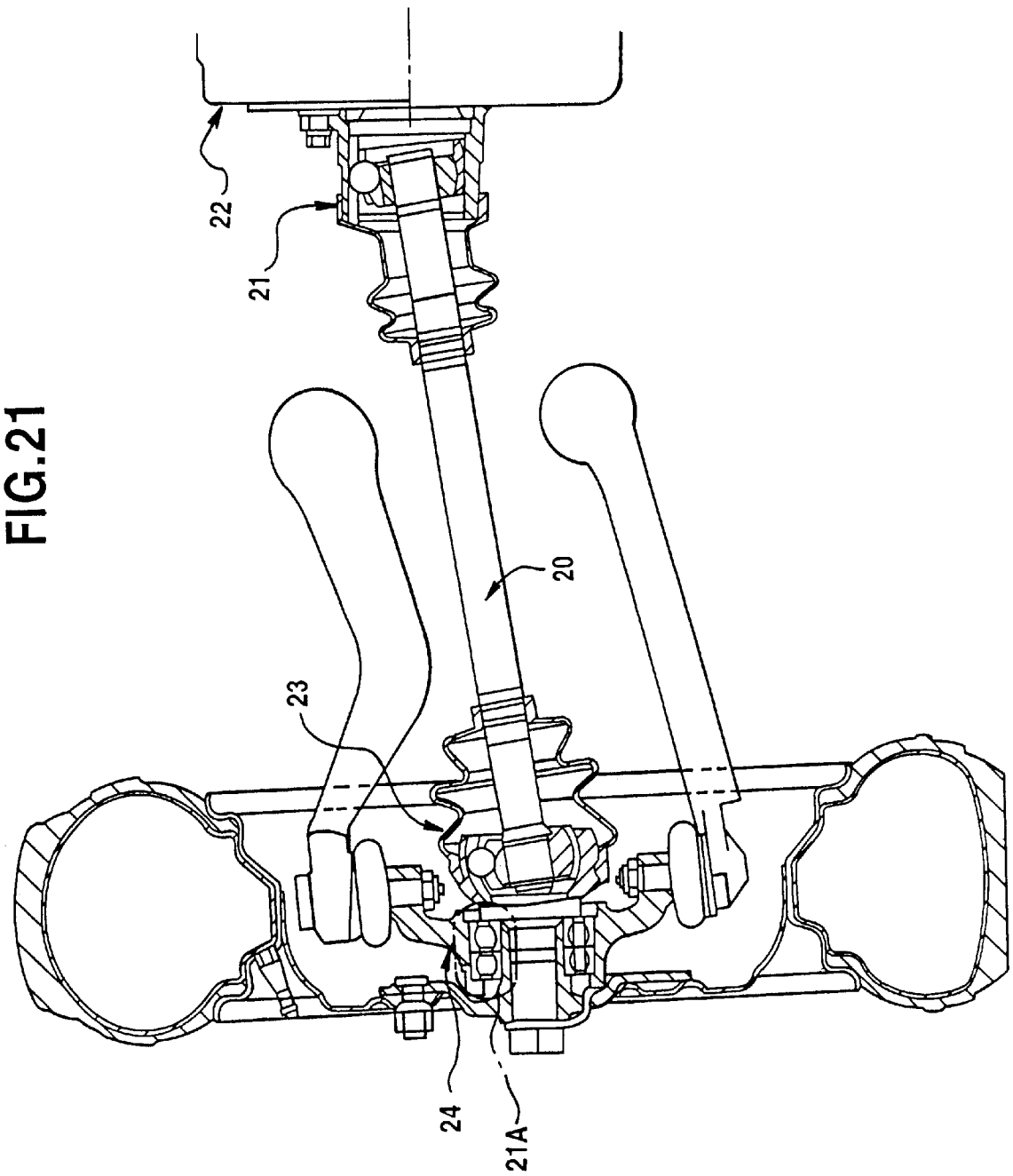
FIG. 21 is a view showing an example (drive shaft) of the power transmission device of an automobile.
Figure 21A:
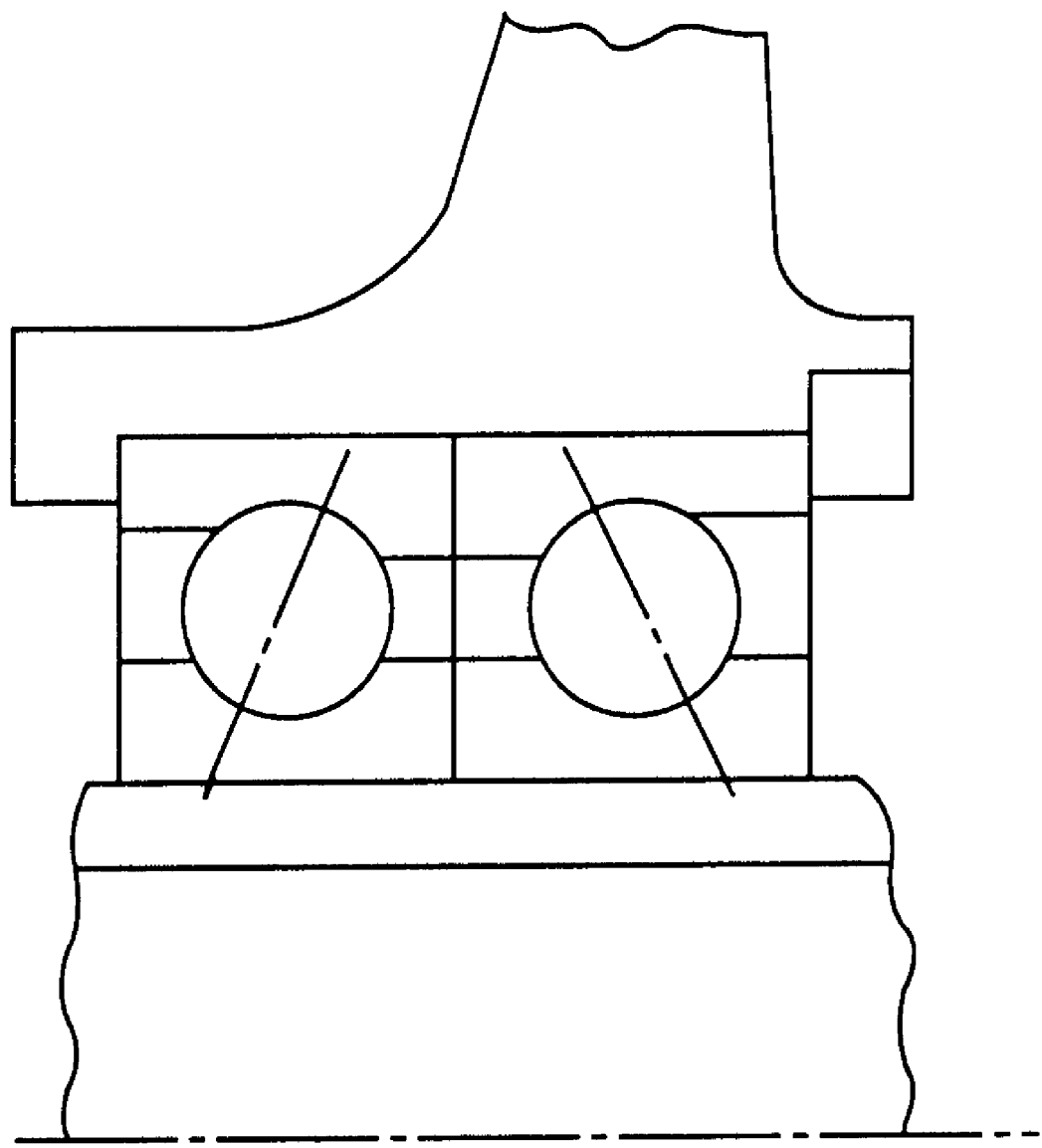
FIG. 21A is an enlarged view of the relevant portion of FIG. 21.

For connecting the drive shaft or propeller shaft of an automobile, usually, the fixed type joint and the plunging type joint are used in pair. For example, the power transmission device of an automobile has to be designed to accommodate angular and axial displacements caused by the change of relative positional relation between the engine and the ground-engaging wheels. Thus, as shown in FIG. 21, a drive shaft 20 interposed between the engine and the wheel is connected at one end to a differential 22 through a plunging type constant velocity joint 21 and at the other end to the wheel 24 through a fixed type constant velocity joint 23.

If the constant velocity joint described in the above embodiments is used as the fixed type constant velocity joint 23 for connecting the drive shaft 20, this use enables the joint to be reduced in size while securing the strength, load capacity and durability which are at least as high as in the comparative article (6-ball fixed type constant velocity joint); thus, the use is is very advantageous from the viewpoint of vehicle weight reduction and hence low fuel cost.

Figure 22A:
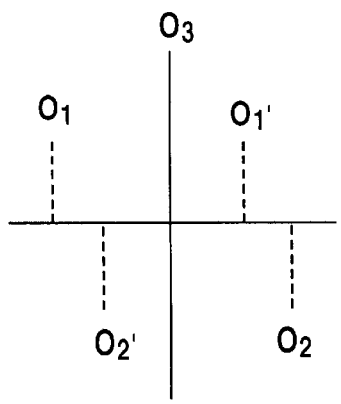
FIG. 22 is a view showing a variation of the positional relation of the center of the guide grooves of the outer joint member, the center of the guide grooves of the inner joint member, the spherical center of the inner surface of the outer joint member (the spherical center of the outer surface of the cage), and the spherical center of the outer surface of the inner joint member (the spherical center of the inner surface of the cage)
Figure 22B:
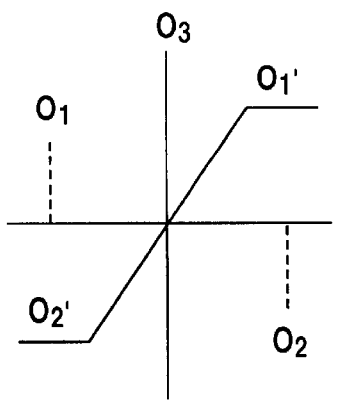
Figure 22C:
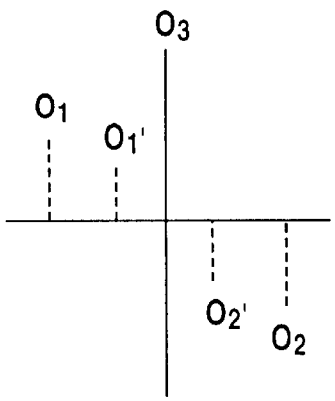
Figure 22D:
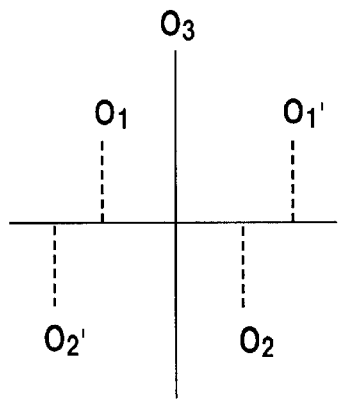
Figure 22E:
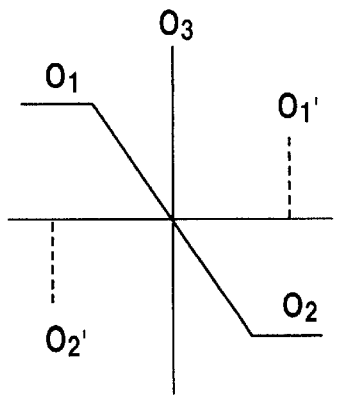
Figure 22F:
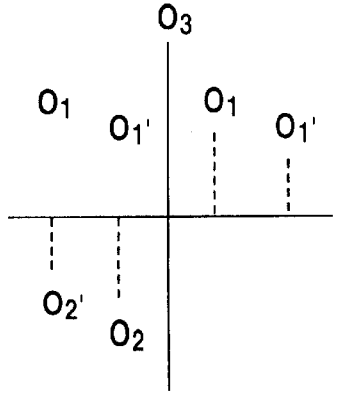
Figure 22G:
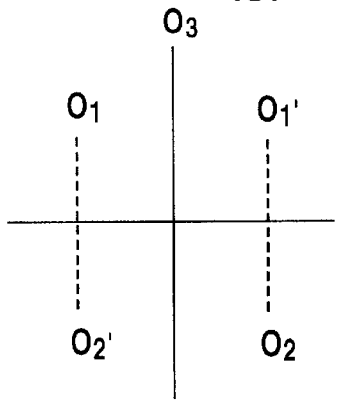
Figure 22H:
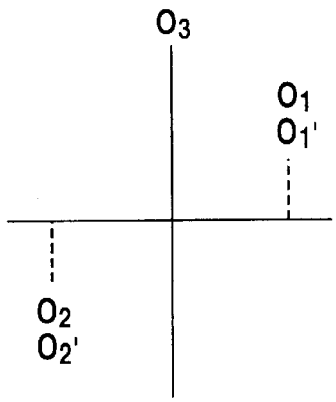

In addition, in this type of constant velocity joint, the positional relation among the centers of the guide grooves of the outer and inner joint members, the spherical center of the inner surface of the outer joint member (the spherical center of the outer surface of the cage), and the spherical center of the outer surface of the inner joint member (the spherical center of the inner surface of the cage) has 8 variations (a)-(h), and the present invention can be applied to any of these variations. In this connection, it is to be noted that the arrangement shown in FIGS. 1A and 1B corresponds to FIG. 22(b), and the arrangements shown in FIGS. 15A, 15B and in FIGS. 20A, 20B both correspond to FIG. 22(a). Further, it is in the arrangements shown in FIGS. 22(a), (d), (e), (f) and (g) that the movements of the torque transmitting balls are at their greatest on the outer surface side of the cage.

The present invention is applicable not only to a constant velocity joint arranged such that the inner joint member and the shaft are interconnected by a tooth profile (serrations or splines) but also to a constant velocity joint arranged such that the inner joint member and the shaft are integrated. For example, it is possible to employ an arrangement in which after the torque transmitting balls have been incorporated into the outer joint member, the shaft is integrally joined (by welding, such as laser beam welding, pressing or the like) to the end surface of the inner joint member.

What is claimed is:

1. A constant velocity joint assembly comprising:

a fixing member connected to a body of an automobile;

a flange member comprising a flange portion connected to a wheel of the automobile and a bore portion;

an outer joint member having a mouth portion and a stem portion, the mouth portion having eight axially extending curved guide grooves formed in a spherical inner surface thereof, the stem portion being connected to the bore portion of the flange member;

an inner joint member having eight axially extending curved guide grooves formed in a spherical outer surface thereof;

eight ball tracks defined between said guide grooves of said outer joint member and said guide grooves of said inner joint member corresponding thereto, all of said ball tracks being enlarged in wedge form in one sense of the axial direction;

eight torque transmitting balls disposed in each of said ball tracks;

a cage having eight pockets for storing said torque transmitting balls; and a bearing having double-row rolling elements rotatably supporting the rotation of the flange member with respect to the fixing member, the bearing being axially disposed between the flange portion of the flange member and the mouth portion of the outer joint member.

2. A constant velocity joint as set forth in claim 1, wherein a ratio r1 (=$PCD_{BALL}/D_{BALL}$) of a pitch circle diameter ($PCD_{BALL}$) of said torque transmitting balls to a diameter ($D_{BALL}$) of each of said torque transmitting balls is within a range of $3.3 \leq r1 \leq 5.0$.

3. A constant velocity joint as set forth in claim 2, wherein a ratio r2 (=$D_{OUTER}/PCD_{SERR}$) of the outer diameter ($D_{OUTER}$) of said outer joint member to a pitch circle diameter ($PCD_{SERR}$) of a tooth profile formed in an inner surface of said inner joint member is within a range of $2.5 \leq r2 \leq 3.5$.

4. A constant velocity joint as set forth in claim 1, wherein a ratio r2 (=$D_{OUTER}/PCD_{SERR}$) of an outer diameter ($D_{OUTER}$) of said outer joint member to a pitch circle diameter ($PCD_{SERR}$) of a tooth profile formed in an inner surface of said inner joint member is within a range of $2.5 \leq r2 \leq 3.5$.

* * * * *